(12) United States Patent
Sugaya

(10) Patent No.: US 12,356,244 B2
(45) Date of Patent: *Jul. 8, 2025

(54) COMMUNICATION DEVICE AND COMMUNICATION METHOD

(71) Applicant: Sony Group Corporation, Tokyo (JP)

(72) Inventor: Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,728

(22) Filed: Apr. 17, 2024

(65) Prior Publication Data
US 2024/0267788 A1 Aug. 8, 2024

Related U.S. Application Data

(63) Continuation of application No. 17/283,578, filed as application No. PCT/JP2019/035696 on Sep. 11, 2019, now Pat. No. 11,974,163.

(30) Foreign Application Priority Data

Nov. 1, 2018 (JP) ................................ 2018-206308

(51) Int. Cl.
*H04W 28/00* (2009.01)
*H04W 28/02* (2009.01)
(Continued)

(52) U.S. Cl.
CPC ....... *H04W 28/06* (2013.01); *H04W 28/0236* (2013.01); *H04W 72/0446* (2013.01);
(Continued)

(58) Field of Classification Search
CPC ............. H04W 28/06; H04W 28/0236; H04W 72/541; H04W 72/52; H04W 72/0446;
(Continued)

(56) References Cited

U.S. PATENT DOCUMENTS 11,601,184 B2 * 3/2023 Sugaya ..................... H04L 1/08
12,144,063 B2 * 11/2024 Chu ....................... H04L 5/0044
(Continued)

FOREIGN PATENT DOCUMENTS

EP 3425956 A1 1/2019
JP 2003-163670 A 6/2003
(Continued)

OTHER PUBLICATIONS

International Search Report and Written Opinion mailed on Oct. 15, 2019, received for PCT Application PCT/JP2019/035696, Filed on Sep. 11, 2019, 11 pages including English Translation.
(Continued)

*Primary Examiner* — Khai M Nguyen
(74) *Attorney, Agent, or Firm* — XSENSUS LLP

(57) ABSTRACT

A communication device is provided that performs highly reliable data communication using a plurality of channels. The communication device includes: a generation unit that generates a transmission frame including an aggregation frame in which a sequence of subframes is multiplexed in a time axis direction and a frequency channel axis direction; and a transmission unit that wirelessly transmits the transmission frame. The generation unit generates the aggregation frame aggregated to cause each of the subframes included in the sequence to be stored at least once in each of frequency channels, and arranges in the aggregation frame at least one slot for receiving a continuation request signal.

17 Claims, 24 Drawing Sheets

(51) Int. Cl.
*H04W 28/06* (2009.01)
*H04W 72/0446* (2023.01)
*H04W 72/0453* (2023.01)
*H04W 72/52* (2023.01)
*H04W 72/541* (2023.01)
*H04W 84/12* (2009.01)

(52) U.S. Cl.
CPC ....... *H04W 72/0453* (2013.01); *H04W 72/52* (2023.01); *H04W 72/541* (2023.01); *H04W 84/12* (2013.01)

(58) Field of Classification Search
CPC .................. H04W 72/0453; H04W 84/12; H04W 370/33
See application file for complete search history.

(56) References Cited

U.S. PATENT DOCUMENTS

| | | | |
|---|---|---|---|
| 12,192,148 B2* | 1/2025 | Ahn | H04L 5/0055 |
| 12,193,116 B2* | 1/2025 | Ahn | H04W 74/08 |
| 2008/0018784 A1* | 1/2008 | Bennett | H04N 21/44012 |
| | | | 348/439.1 |
| 2009/0191885 A1 | 7/2009 | Nosley | |
| 2012/0057498 A1* | 3/2012 | Han | G01S 5/0036 |
| | | | 370/252 |
| 2015/0131516 A1 | 5/2015 | Zhang | |
| 2015/0271002 A1* | 9/2015 | Oh | H04L 27/2602 |
| | | | 370/329 |
| 2016/0173255 A1* | 6/2016 | Lee | H04J 13/0048 |
| | | | 370/329 |
| 2017/0338914 A1* | 11/2017 | Chu | H04L 1/1621 |

FOREIGN PATENT DOCUMENTS

| | | |
|---|---|---|
| JP | 2011-055433 A | 3/2011 |
| WO | 2017/006635 A1 | 1/2017 |
| WO | 2017/150288 A1 | 9/2017 |

OTHER PUBLICATIONS

Asai, "In-Depth Analysis! 802.11ac", Network, Apr. 2014, vol. 168, pp. 48-64.

* cited by examiner

FIG. 12

| MAC Header | Multi Channel Aggregate Announce Information Element | | | | | | | FCS |
|---|---|---|---|---|---|---|---|---|
| | Type | Length | A-MPDU Max Size | Aggregate Counts | Aggregate Start Ch. | Aggregate Ch. Bitmap | Resend Slot Location | Aggregate Direction | |

*FIG. 13*

| MAC Header | Multi Channel Aggregate Response Information Element | | | | | | | FCS |
|---|---|---|---|---|---|---|---|---|
| | Type | Length | A-MPDU Max Size | Aggregate Counts | Aggregate Start Ch. | Available Ch. Bitmap | Resend Slot Location | Aggregate Direction | |

FIG. 14

| Resend Signal Slot | | |
|---|---|---|
| 12 μs | | |
| RTTT :2 μs | Resend Signal (L-STF) :8 μs | TRTT :2 μs |

FIG. 15

| RIFS | Resend Signal Slot | | |
|---|---|---|---|
| | L-STF | L-LTF | L-SIG |
| 2 μs | 8 μs | 8 μs | 4 μs |

COMMUNICATION DEVICE AND COMMUNICATION METHOD

CROSS-REFERENCE TO RELATED APPLICATIONS

The present application is a continuation of U.S. application Ser. No. 17/283,578 filed Apr. 8, 2021, which is based on PCT filing PCT/JP2019/035696, filed Sep. 11, 2019, which claims priority to JP 2018-206308, filed Nov. 1, 2018, the entire contents of each are incorporated herein by reference.

TECHNICAL FIELD

The technology disclosed in this specification relates to a communication device and a communication method for performing data communication using a plurality of channels.

BACKGROUND ART

In a conventional wireless Local Area Network (LAN) system, the amount of data transmission can be dramatically increased by applying a channel bonding technology using a plurality of channels having a bandwidth of 20 MHZ (see, for example, Patent Document 1). In IEEE 802.11-based standards, a technology for combining and using two channels is defined as 11n standard, and a technology for combining and using eight channels is defined as 11ac standard.

To apply channel bonding technology in the conventional wireless LAN system, it is a prerequisite that all the frequency channels used are not used in another network. For this reason, even if the same data is transmitted to a plurality of channels and one channel is subjected to interference from the other network, if the other channel can receive the data without error, that information can be received correctly.

Furthermore, in recent years, in a wireless LAN system, a frame aggregation technology for transmitting a plurality of data units (hereinafter, also referred to as "subframes") as a connection of one data has been put into practice (see, for example, Patent Document 2). This frame aggregation technology is called an aggregate Media Access Control (MAC) layer protocol data unit (A-MPDU), and can transmit the subframes continuously by performing a predetermined access procedure on a wireless transmission line only once, by transmitting a plurality of MPDUs as one frame, and can perform efficient communication.

On the other hand, as a communication method that ensures high reliability, a method is conceivable of collecting only error-free data by transmitting the same data (subframe or MPDU) a plurality of times using different timings and different frequency channels. However, this method has not been widely implemented since the utilization efficiency of the transmission line is decreased.

For example, a wireless communication device has been devised that improves reliability by transmitting packets divided with use of a plurality of channels of different frequencies and selecting a retransmission mode depending on a transmission result (see Patent Document 3).

CITATION LIST

Patent Document

Patent Document 1: WO2017/006635
Patent Document 2: Japanese Patent Application Laid-Open No. 2011-055433
Patent Document 3: Japanese Patent Application Laid-Open No. 2003-163670

SUMMARY OF THE INVENTION

Problems to be Solved by the Invention

An object of the technology disclosed in this specification is to provide a communication device and a communication method for performing highly reliable data communication using a plurality of channels.

Solutions to Problems

A first aspect of the technology disclosed in this specification is
a communication device including:
a generation unit that generates a transmission frame including an aggregation frame in which a sequence of subframes is multiplexed in a time axis direction and a frequency channel axis direction; and
a transmission unit that wirelessly transmits the transmission frame.
The generation unit generates the aggregation frame aggregated to cause each of the subframes included in the sequence to be stored at least once in each of frequency channels, and arranges in the aggregation frame at least one slot for receiving a continuation request signal.

Furthermore, a second aspect of the technology disclosed in this specification is
a communication method including:
generating an aggregation frame in which a sequence of subframes is multiplexed in a time axis direction and a frequency channel axis direction; and
wirelessly transmitting the transmission frame.

Furthermore, a third aspect of the technology disclosed in this specification is
a communication device including:
a reception unit that receives a wireless frame including an aggregation frame in which a sequence of subframes is multiplexed in a time axis direction and a frequency channel axis direction; and
a construction unit that collects the subframes included in the aggregation frame received, and reconstructs a sequence of the subframes.

The communication device according to the third aspect transmits a continuation request signal for requesting continuous transmission of the aggregation frame until all subframes of the sequence included in the aggregation frame are collected.

Furthermore, the communication device according to the third aspect determines that a transmission line used for transmission of the aggregation frame has become available in a case where an end signal for notification of a transmission end of the aggregation frame is received.

Furthermore, a fourth aspect of the technology disclosed in this specification is
a communication method including:
receiving an aggregation frame in which a sequence of subframes is multiplexed in a time axis direction and a frequency channel axis direction; and
collecting the subframes included in the aggregation frame received, and reconstructing a sequence of the subframes.

Effects of the Invention

According to the technology disclosed in this specification, a communication device and a communication method can be provided that implements highly reliable data communication by performing channel bonding to increase the amount of data transmission and applying aggregation technology to improve transmission efficiency.

Note that, the effects described in this specification are merely examples, and the effects of the present invention are not limited to them. Furthermore, the present invention may have additional effects other than the effects described above.

Still other objects, features, and advantages of the technology disclosed in this specification will become apparent from the detailed description based on embodiments and attached drawings to be described later.

BRIEF DESCRIPTION OF DRAWINGS

FIG. 12 is a diagram illustrating a configuration example of a multi-channel aggregation announcement frame.

FIG. 13 is a diagram illustrating a configuration example of a multi-channel aggregation response frame.

FIG. 14 is a diagram illustrating a configuration example of a slot for a reply of the Resend Request signal.

FIG. 15 is a diagram illustrating a configuration of a Finish signal.

MODE FOR CARRYING OUT THE INVENTION

Figure 1:
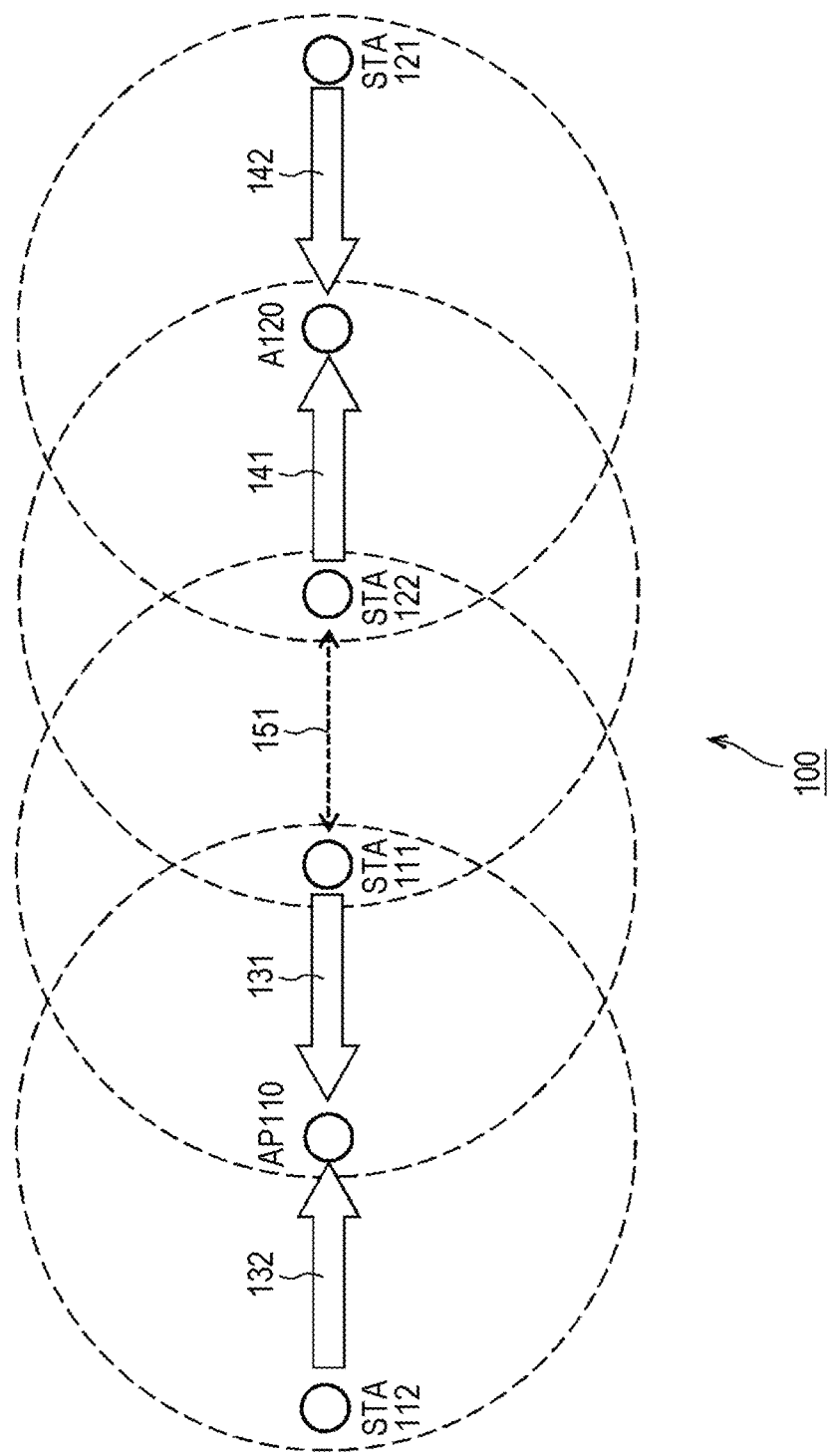
FIG. 1 is a diagram illustrating a configuration example of a wireless LAN network 100.

Hereinafter, embodiments of the technology disclosed in this specification will be described in detail with reference to the drawings.

In a random access-based wireless LAN system, a design is made so that a different network is operated for each of channels. For this reason, there is a problem that channel bonding cannot be simply performed.

Furthermore, with the spread of the wireless LAN system, it is becoming difficult to continuously secure usable frequency channels. For example, even a communication system designed to use eight frequency channels (160 MHz in total) has not been able to sufficiently use channel bonding. In the wireless LAN system, unlike a cellular system, there is also a circumstance in which all channels are not operated in coordination with surrounding base stations (access points).

In the wireless LAN system, if there is even one other network with overlapping communication ranges, the only way to avoid interference and perform data transmission is to use less frequency, and it is not possible to perform data transmission using all bands. That is, in the wireless LAN system, the reality is that it is difficult to perform data transmission by performing channel bonding. For example, in the wireless communication device disclosed in Patent Document 3, transmitting the same data through a plurality of channels is inefficient since the transmission line utilization efficiency is halved accordingly. Even if the same data is transmitted simultaneously using a plurality of frequency channels only at the time of retransmission, there is no change in that the exact same data is retransmitted.

Furthermore, even in a case where the conventional frame aggregation technology is used, a transmission source cannot determine the necessity of retransmission unless a reception side returns receipt confirmation. For this reason, it is necessary to perform access control until a receipt confirmation frame is transmitted to a transmission line.

Thus, in this specification, a wireless communication technology is devised below in which channel bonding is performed to multiplex data in the frequency axis direction and increase the amount of data transmission, and frame aggregation technology is applied to multiplex data in the time axis direction and improve transmission efficiency.

Specifically, on a transmission side, channel bonding is performed to transmit an aggregation frame (hereinafter, also referred to as "multi-channel aggregation frame") in which a plurality of subframes is aggregated in each channel. On the reception side, even if some channels subjected to channel bonding is subjected to interference from another network, the same subframe can be received by another channel, so that the reliability of data communication is improved.

Furthermore, on the transmission side, in a case where the data is transmitted by performing channel bonding, a multi-channel aggregation frame is configured and transmitted in which aggregation is performed by changing the order of aggregating the subframes for each channel. On the other hand, on the reception side, by collecting the subframes that can be received and decoded in each channel, all the subframes can be collected in a short time, so that the transmission efficiency is improved.

Furthermore, the reception side makes notification by a continuation request signal that the collection of all the subframes has not been completed yet. Thus, on the transmission side, in a case where the continuation request signal is no longer received, it can be determined that the reception side has completed the collection of all the subframes, so that the transmission of the multi-channel aggregation frame is interrupted and the channels are released to another communication, whereby the channel utilization efficiency can be improved.

FIG. 1 illustrates a configuration example of a wireless LAN network 100 to which the technology disclosed in this specification can be applied.

In FIG. 1, a communication device STA111 and a communication device 112 are connected to a wireless LAN access point AP110 to form one wireless network or Basic Service Set (BSS). Furthermore, a communication device STA121 and a communication device 122 are connected to a wireless LAN access point AP120 to form one wireless network or BSS. Then, it is assumed that these two wireless networks are in contact with each other.

In FIG. 1, a signal reach range of each communication device is illustrated by a broken line. It is schematically represent that adjacent communication devices have respective signal reach ranges overlap with each other and each are placed at a position where a signal output from the other device can be detected.

Furthermore, in each wireless network, on the basis of Orthogonal Frequency Division Multiple Access, uplink multi-user multiplex data (UL OFDMA) communication from the STA111 and the STA112 to the AP110, and UL OFDMA communication from the STA121 and the STA122 to the AP120 are each performed, as illustrated in reference numerals 131, 132, 141, and 142.

Then, the communication devices STA111 and STA122 belonging to the adjacent wireless networks each are in a state of being present at a position where each other's signal can be detected as illustrated in reference numeral 151. That is, from the communication device STA111 of the network configured by one access point AP110, the communication device STA122 of the network configured by the other access point AP120 is recognized as an overlapping BSS (OBSS). Conversely, from the STA122, the STA111 is recognized as an OBSS.

Figure 2:
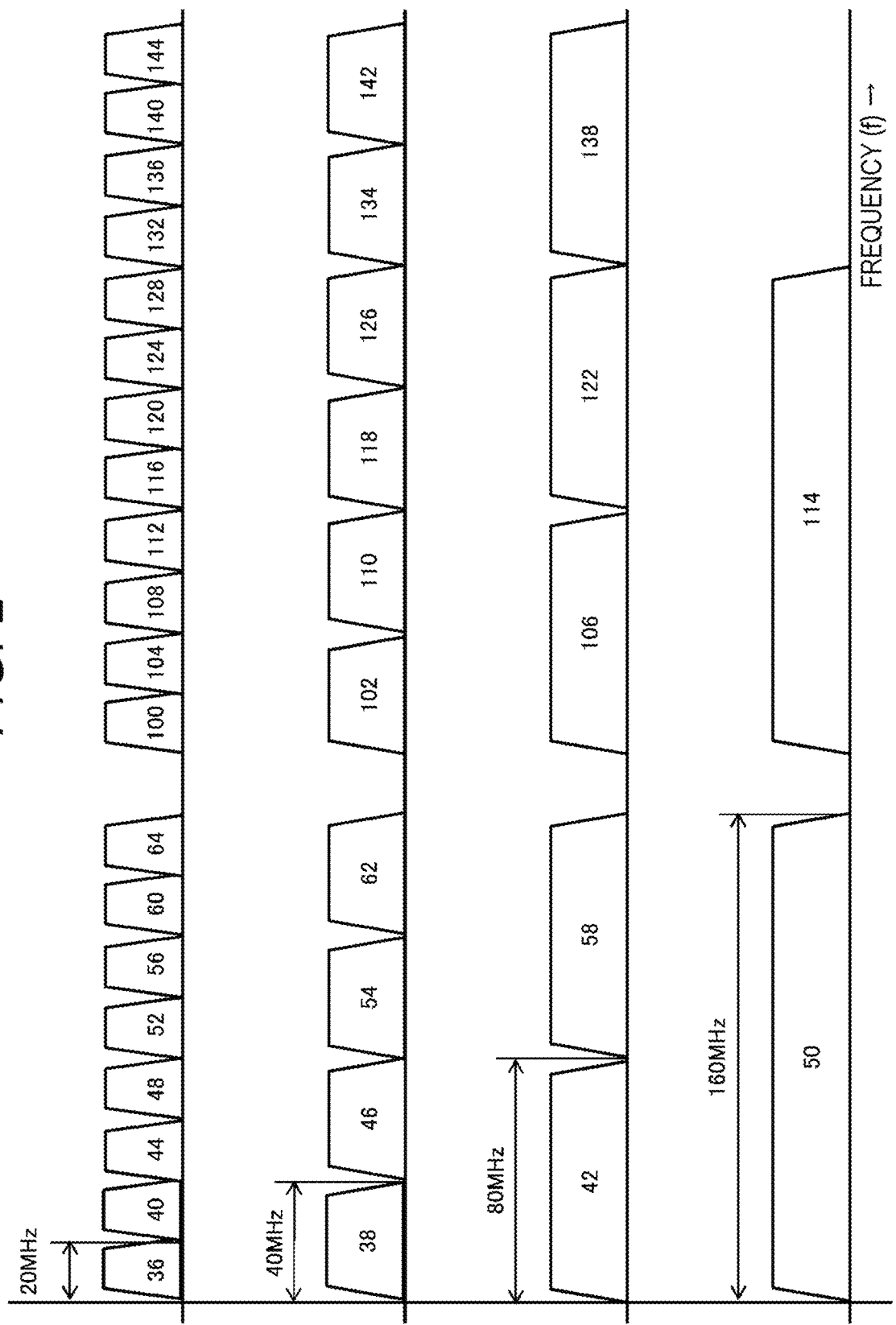
FIG. 2 is a diagram illustrating an arrangement of frequency channels available in a wireless LAN system.

FIG. 2 illustrates an arrangement of the frequency channels available in the wireless LAN system. Here, a channel arrangement in a currently available 5 GHz band is illustrated.

As illustrated in the uppermost row in FIG. 2, a configuration is illustrated in a case where channels are used in units of 20 MHz, and channels 36, 40, 44, 48, 52, 56, 60, and 64 are arranged in order from the lowest frequency. At higher frequencies, the channels are arranged up to channels 100, 104, 108, 112, 116, 120, 124, 128, 132, 136, 140, and 144.

Furthermore, the second row from the top in FIG. 2 illustrates a configuration in a case where channels are used in units of 40 MHz, and channels 38, 46, 54, and 62 are arranged in order from the lowest frequency. At higher frequencies, the channels are arranged up to channels 102, 110, 118, 126, 134, and 142.

Furthermore, the third row from the top in FIG. 2 illustrates a configuration in a case where channels are used in units of 80 MHz, and channels 42 and 58 are arranged in order from the lowest frequency. At higher frequencies, the channels are arranged up to channels 106, 122, and 138.

Furthermore, the fourth row from the top in FIG. 2 illustrates a configuration in a case where channels are used in units of 160 MHz, and a channel 50 is arranged in order from the lowest frequency. At higher frequencies, the channel is arranged up to a channel 114.

Note that, regarding these available frequency channels illustrated in FIG. 2, the ranges may differ since the available frequency bands regulated in each country are different. Furthermore, application is also possible to other frequency bands (2.4 GHz band and 60 GHz band), a frequency band that can be newly used (6 GHZ band), and the like, and application is also possible to a case where these different frequency bands are used together.

Figure 3:
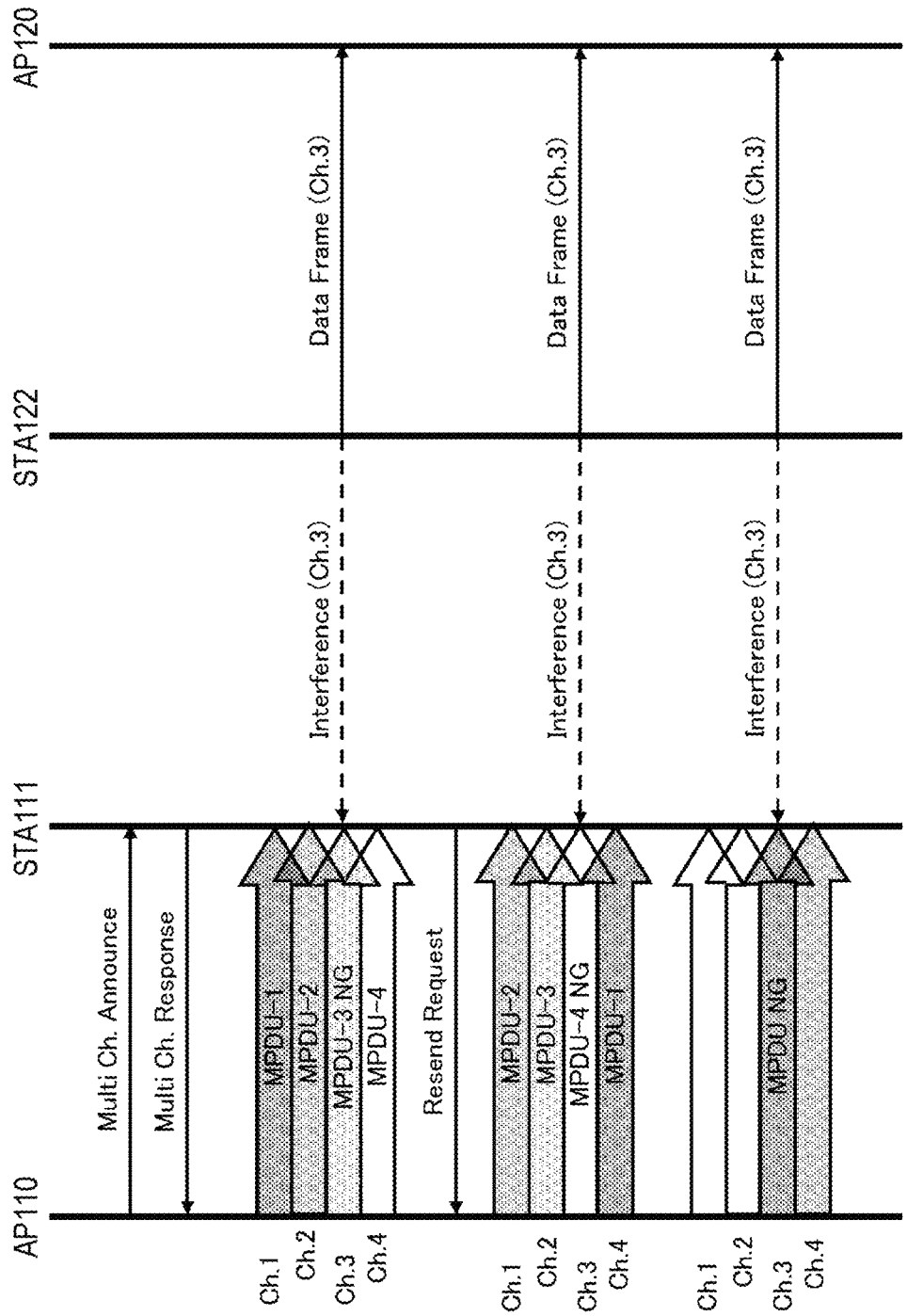
FIG. 3 is a diagram illustrating an example of a sequence for performing multi-channel aggregation.

FIG. 3 illustrates a schematic sequence example of performing multi-channel aggregation. Aggregation is a technology that multiplexes subframes in the time axis direction to improve transmission efficiency, and multi-channel aggregation is a technology that further multiplexes aggregation frames in the frequency axis direction to implement highly reliable data communication. Note that, FIG. 3 illustrates an example in which the access point AP110 performs multi-channel aggregation with the communication device STA111 under the control, in the wireless LAN network illustrated in FIG. 1, and it is assumed that the STA122 under the control of the AP120 exists as the OBSS of the STA111.

First, parameters in a case where multi-channel aggregation is performed are exchanged between the AP110 and the STA111. Specifically, a Multi Channels Aggregation Announce frame is transmitted from the AP110 to the STA111 for notification of performing the multi-channel aggregation, and in response to this, a Multi Channels Aggregation Response frame is returned from the STA111 to the AP110 for notification of approval of performing the multi-channel aggregation. Details of frame structures of these will be given later.

Then, in a case where data communication by the multi-channel aggregation is performed, four frequency channels from Ch.1 to Ch.4 are used and subframes from MPDU-1 to MPDU-4 that are first aggregated are transmitted from the AP110 to the STA111.

Here, a data frame transmitted with use of the frequency channel Ch.3 to the OBSS access point AP120 by the STA122 that is an OBSS communication device adjacent to the STA111 that is a reception side communication device is interference (Interference (Ch. 3)), and the STA111 cannot correctly receive the subframe MPDU-3 transmitted on the frequency channel Ch.3.

Thus, since the STA111 is subjected to the interference on the frequency channel Ch.3, the STA111 transmits to the AP110 a Resend Request (continuation request signal)

requesting transmission continuation (retransmission) of the multi-channel aggregation frame. Details of a specific transmission method for the continuation request signal will be described later.

Since the AP110 that is a transmission side communication device detects a signal at the timing of this Resend Request, the subframes of the MPDU-2 to MPDU-4 and MPDU-1 that are secondly subjected to aggregation are transmitted with use of four frequency channels from Ch.1 to Ch.4, respectively. That is, the AP110 transmits the multi-channel aggregation frame by changing the subframe transmitted in each frequency channel.

The STA111 can correctly receive the MPDU-3 on the frequency channel Ch.2. Furthermore, since the STA111 is subjected to interference of the data frame transmitted to the AP120 with use of the frequency channel Ch.3 by the STA122 that is the OBSS, the MPDU-4 sent with use of the frequency channel Ch.3 cannot be correctly received, but the MPDU-4 has already been collected, so that the STA111 can collect all the subframes from the MPDU-1 to MPDU-4.

Since the collection of all the subframes from the MPDU-1 to MPDU-4 is completed, the STA111 stops transmission of the Resend Request to AP110. Then, the AP110 no longer detects the Resend Request from the STA111 that is the device for performing the multi-channel aggregation, so that the transmission of the multi-channel aggregation frame can be interrupted and the remaining time can be used for new communication.

Figure 4:
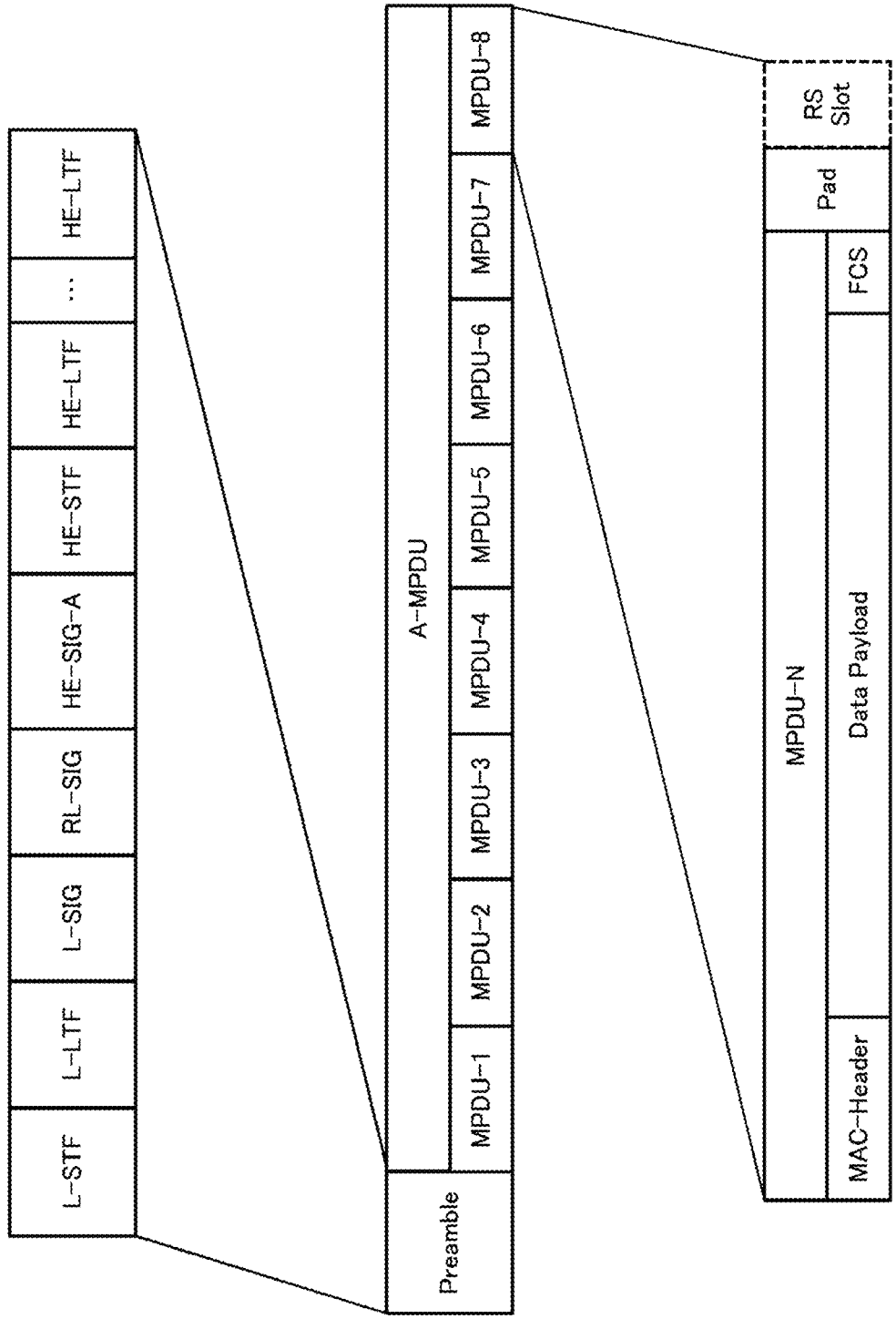
FIG. 4 is a diagram illustrating a format example to which frame aggregation is applied.

FIG. 4 illustrates a format example to which frame aggregation is applied, according to the present embodiment. The illustrated frame format has a main feature in that, in addition to a conventional A-MPDU configuration, a slot (RS Slot) is provided as appropriate for returning a continuation request signal requesting for continuation of transmission of a multi-channel aggregation frame at the end of a specific MPDU as needed.

In the illustrated frame format, as a preambles, conventional known training signals, a Legacy-Short Training Field (L-STF) and an L-Long Training Field (LTF), conventional signal information L-SIG, repetition of the conventional signal information RL-SIG, high-efficiency communication signal information HE-SIG-A, and high efficiency communication known training signals, a High Efficiency (HE)-STF and an HE-LTF, are repeated a predetermined number of times. Generally, the STF is used for signal detection and synchronization acquisition, and the LTF is used for detailed synchronization acquisition and channel estimation.

The A-MPDU following the preamble includes MPDUS corresponding to the number of subframes to be aggregated. In the example illustrated in FIG. 4, the A-MPDU includes eight MPDUs (that is, eight subframes) of MPDU-1 to MPDU-8.

In each MPDU, a data payload, and a frame check sequence (FCS) for error detection and correction of data contents are added to a predetermined MAC header.

Furthermore, for the specific MPDU, the slot (RS Slot) is arranged for returning the signal requesting for continuation of transmission of the multi-channel aggregation frame at the end. Then, filling with padding (Pad) is performed so that this portion becomes a head unit of an OFDM symbol. Note that, the MPDU including a delimiter (not illustrated) at a boundary portion with an adjacent MPDU and the padding at the end is referred to as a subframe.

Figure 24:
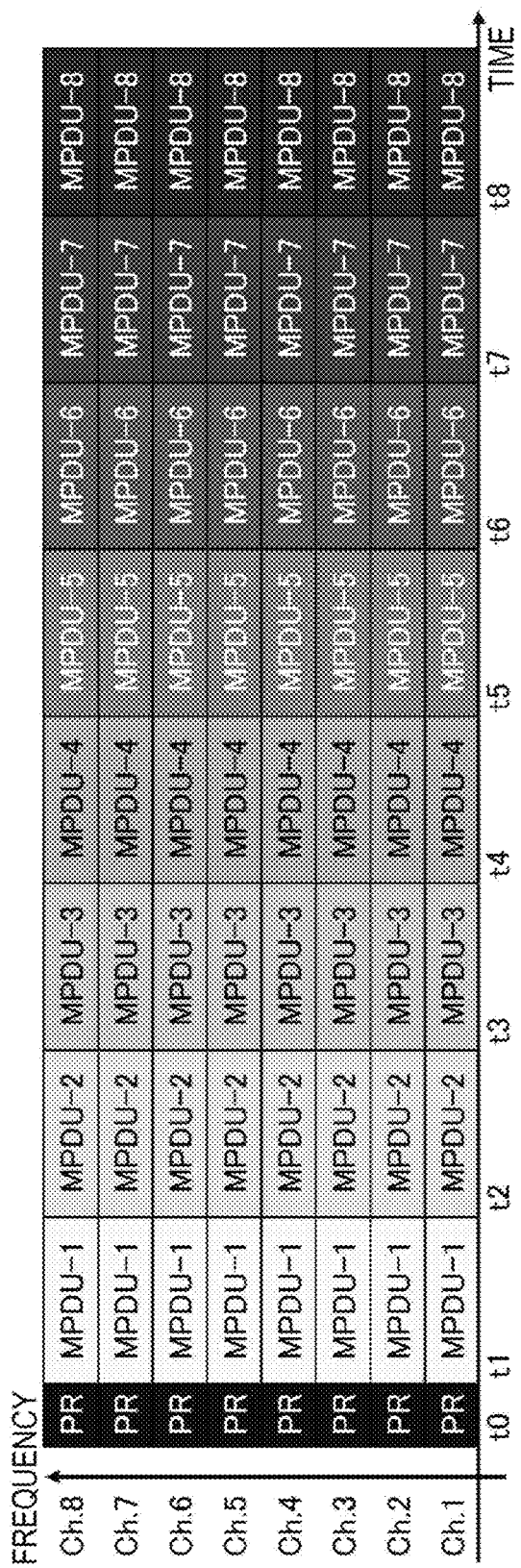
FIG. 24 is a diagram illustrating a configuration example of the multi-channel aggregation frame.

FIG. 24 illustrates a configuration example of the multi-channel aggregation frame, according to the present embodiment. Aggregation is a technology that multiplexes subframes in the time axis direction to improve transmission efficiency, and multi-channel aggregation is a technology that further multiplexes aggregation frames in the frequency axis direction to implement highly reliable data communication.

In FIG. 24, the configuration example is illustrated of the aggregation frame in a case where communication is performed by aggregating, as one frame, eight MPDUs from the MPDU-1 to MPDU-8 with use of a multi-channel including eight frequency channels from channel (Ch) 1 to channel 8. In each channel (Ch.1 to Ch.8), a predetermined preamble (PR) is followed by the eight MPDUs, but the MPDU-1 to MPDU-8 are aggregated in the same order in all channels. Specifically, in all of the Ch.1 to Ch.8, the aggregation is performed in the same order of the MPDU-1, MPDU-2, MPDU-3, . . . , MPDU-7, and MPDU-8.

Note that, in FIG. 24, for convenience, all the MPDUs are drawn with the same information length, but the MPDUs may be configured as variable length subframes.

Figure 25:
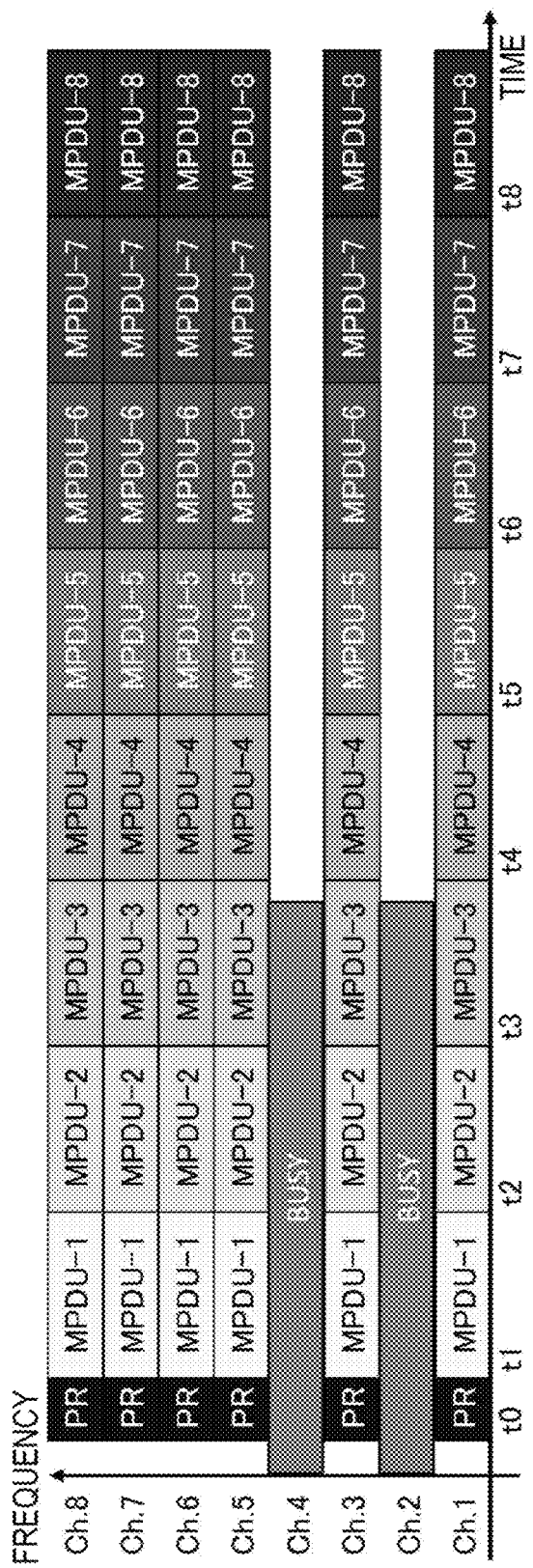
FIG. 25 is a diagram illustrating an operation example of the reception side of the multi-channel aggregation frame.

FIG. 25 illustrates a frame configuration example in a case where the multi-channel aggregation frame having the configuration illustrated in FIG. 24 is actually sequentially transmitted from the transmission side.

In the example illustrated in FIG. 25, the transmission side is supposed to transmit the multi-channel aggregation frame having the frame configuration illustrated in FIG. 24; however, the channels Ch.2 and Ch.4 are not used that are unavailable due to the Busy state at that time (time to), but the Ch.1, Ch.3, and Ch.5 to Ch.8 are used to transmit the aggregation frame of each channel in accordance with a predetermined sequence. Specifically, using the channels of Ch.1, Ch.3, and Ch.5 to Ch.8 excluding Ch.2 and Ch.4 in the Busy state, the transmission side aggregates the subframes in the same order of the MPDU-1, MPDU-2, MPDU-3, . . . , MPDU-7, and MPDU-8, and the aggregation frame is transmitted. Transmission is performed of the multi-channel aggregation frame excluding a frequency channel that may cause interference in communication of another network, on the transmission side, whereby coexistence with a surrounding network can be implemented.

Figure 26:
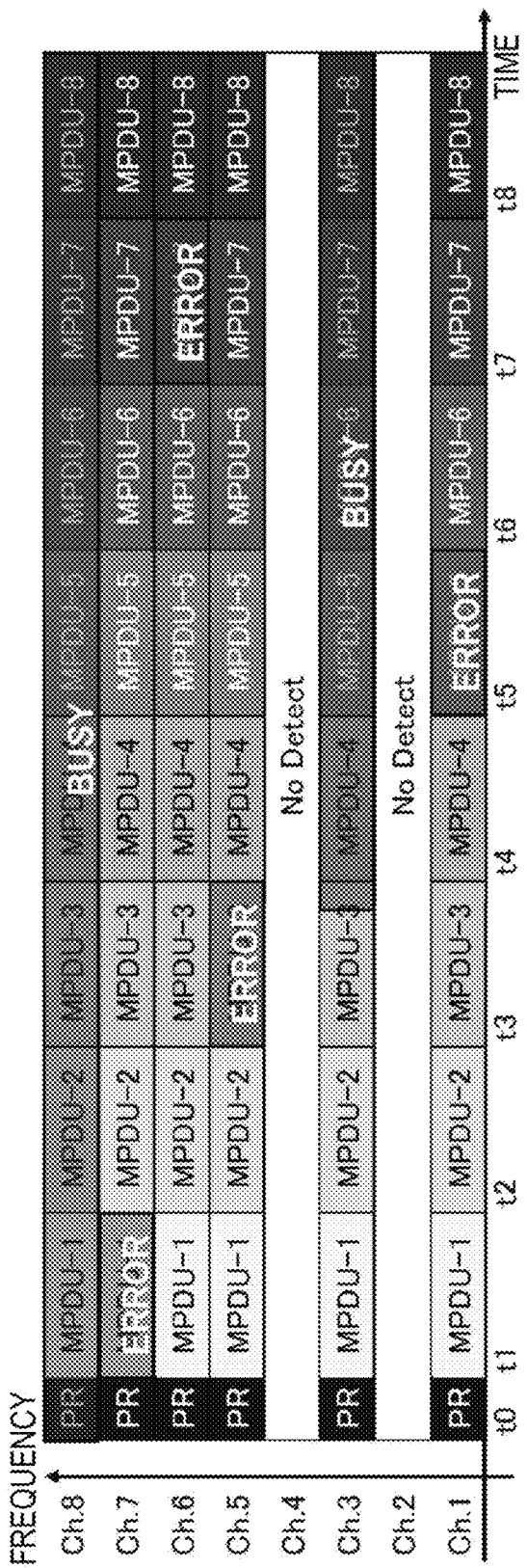
FIG. 26 is a diagram illustrating an operation example of the reception side of the multi-channel aggregation frame.

Furthermore, FIG. 26 illustrates an operation example of the reception side that performs reception processing to the multi-channel aggregation frame having the frame configuration illustrated in FIG. 24. However, it is assumed that, as illustrated in FIG. 25, the transmission side does not use the channels Ch.2 and Ch.4 that are unavailable due to the Busy state at the time of starting transmission (time to), but uses other channels Ch.1, Ch.3, and Ch.5 to Ch.8 to transmit the aggregation frame aggregated in the same order of the MPDU-1, MPDU-2, MPDU-3, . . . , MPDU-7, and MPDU-8.

On the reception side, since it is known in advance that the multi-channel aggregation frame is transmitted from the transmission side, operation of reception is performed on all the channels from the channels Ch.1 to Ch.8. However, the transmission side does not perform transmission on the channels Ch.2 and Ch.4 that are unavailable at that time (time to) in the first place. For this reason, the reception side cannot receive a signal from the preamble (PR) on the channels Ch.2 and Ch.4 (No Detect).

Furthermore, the channel Ch.8 is in the Busy state used around the reception side at that time (time t0), so that the reception side cannot correctly receive the subframes. Moreover, since an error is included in a received subframe (MPDU-5) in the channel Ch.1 in which the preamble (PR) is detected and the subframe can be received, the reception side detects the error by the FCS at the end of the subframe, and is in error. Similarly, since errors are respectively included in the MPDU-3 received at time t3 in the channel Ch.5 in which the reception side can detect the preamble, the MPDU-7 received at time t7 in the channel Ch.6, and the MPDU-1 received at time t1 in the channel Ch.7, the errors are each detected by the FCS at the end, and the reception side is in error. Moreover, the channel Ch.3 received due to detection of the preamble is in the Busy state while receiving the aggregation frame, so that the reception side cannot correctly receive the subsequent subframes.

However, the transmission side operates to transmit the aggregation frames aggregated in the same order of the MPDU-1, MPDU-2, MPDU-3, . . . , MPDU-7, and MPDU-8 by using the channels Ch.1, Ch.3, and Ch.5 to Ch.8. As a result, on the reception side, each subframe of the MPDU-1, MPDU-2, MPDU-3, . . . , MPDU-7, and MPDU-8 can be received by any one of the channels Ch.1, Ch.3, and Ch.5 to Ch. 7, and all the subframes can be collected.

Thus, the highly reliable data communication can be implemented by performing transmission by further multiplexing in the frequency axis direction the aggregation frame in which the subframes are multiplexed in the time axis direction with use of the multi-channel aggregation frame illustrated in FIG. 24. However, since the multi-channel aggregation frame illustrated in FIG. 24 has a configuration in which the subframes (MPDUs) are aggregated in the same order in all the channels, all the channels are occupied for a period corresponding to the number of aggregated subframes, and thus there is a problem in transmission efficiency.

Figure 5:
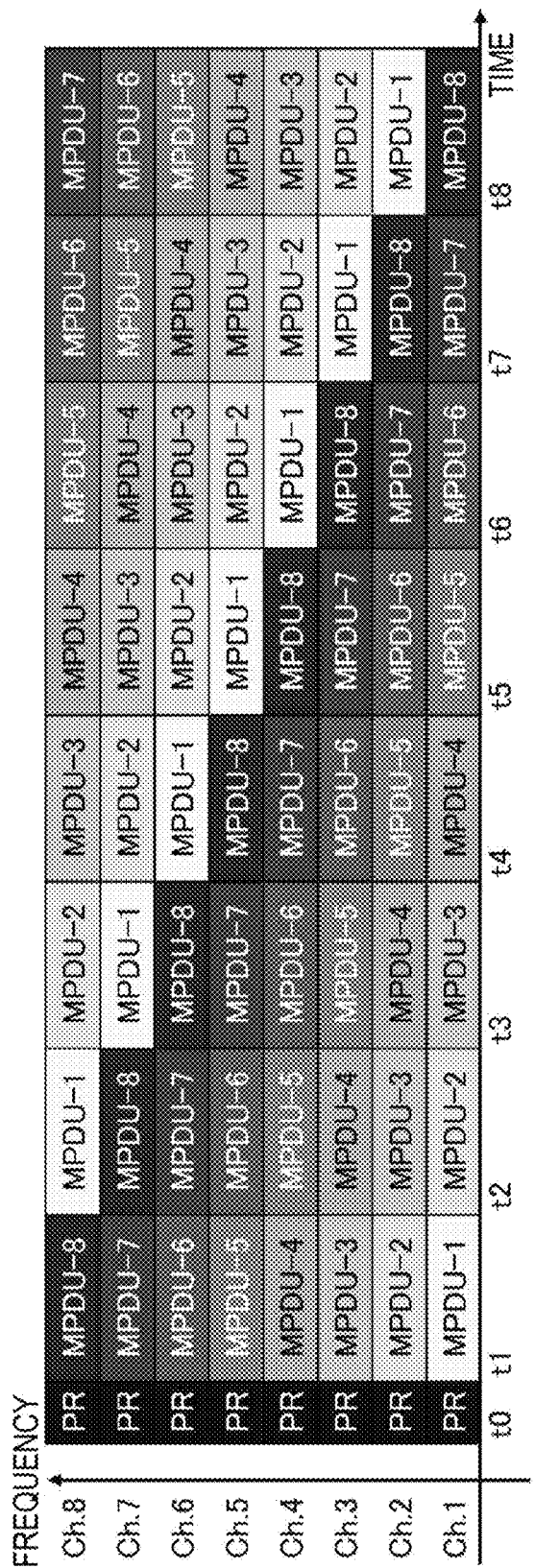
FIG. 5 is a diagram illustrating a configuration example of a multi-channel aggregation frame.

FIG. 5 illustrates another configuration example of the multi-channel aggregation frame, according to the present embodiment. Aggregation is a technology that multiplexes subframes in the time axis direction to improve transmission efficiency, and multi-channel aggregation is a technology that further multiplexes aggregation frames in the frequency axis direction to implement highly reliable data communication.

In FIG. 5, the configuration example is illustrated of the aggregation frame in a case where communication is performed by aggregating, as one frame, eight MPDUs from the MPDU-1 to MPDU-8 with use of a multi-channel including eight frequency channels from channel (Ch) 1 to channel 8. In each channel (Ch.1 to Ch.8), a predetermined preamble (PR) is followed by the eight MPDUs, but there is a main feature in that the order of aggregating the MPDU-1 to MPDU-8 is made different for each channel. It is preferable from the viewpoints of both transmission efficiency and reliability that the order of aggregating the MPDU-1 to MPDU-8 is made different for each channel so that the MPDUs of respective channels do not overlap each other at the same time.

Specifically, in the Ch.1, aggregation is performed in the order of the MPDU-1, MPDU-2, MPDU-3, . . . , MPDU-7, and MPDU-8. Furthermore, in the Ch.2, aggregation is performed in the order of the MPDU-2, MPDU-3, . . . , MPDU-8, and MPDU-1; in the Ch.3, aggregation is performed in the order of the MPDU-3, MPDU-4, . . . , MPDU-1, and MPDU-2; in the Ch.4, aggregation is performed in the order of the MPDU-4, MPDU-5, . . . , MPDU-2, and MPDU-3; in the Ch.5, aggregation is performed in the order of the MPDU-5, MPDU-6, . . . , MPDU-3, and MPDU-4; in the Ch.6, aggregation is performed in the order of the MPDU-6, MPDU-7, . . . , MPDU-4, and MPDU-5; in the Ch.7, aggregation is performed in the order of the MPDU-7, MPDU-8, . . . , MPDU-5, and MPDU-6; and in the Ch.8, aggregation is performed in the order of the MPDU-8, MPDU-1, . . . , MPDU-6, and MPDU-7. As described above, by shifting the MPDUs one by one in order for each channel, aggregation is performed of the eight MPDUs in each channel in a manner such that the MPDUs of respective channels do not overlap each other at the same time.

Note that, in FIG. 5, for convenience, all the MPDUs are drawn with the same information length, but the MPDUs may be configured as variable length subframes.

Figure 6:
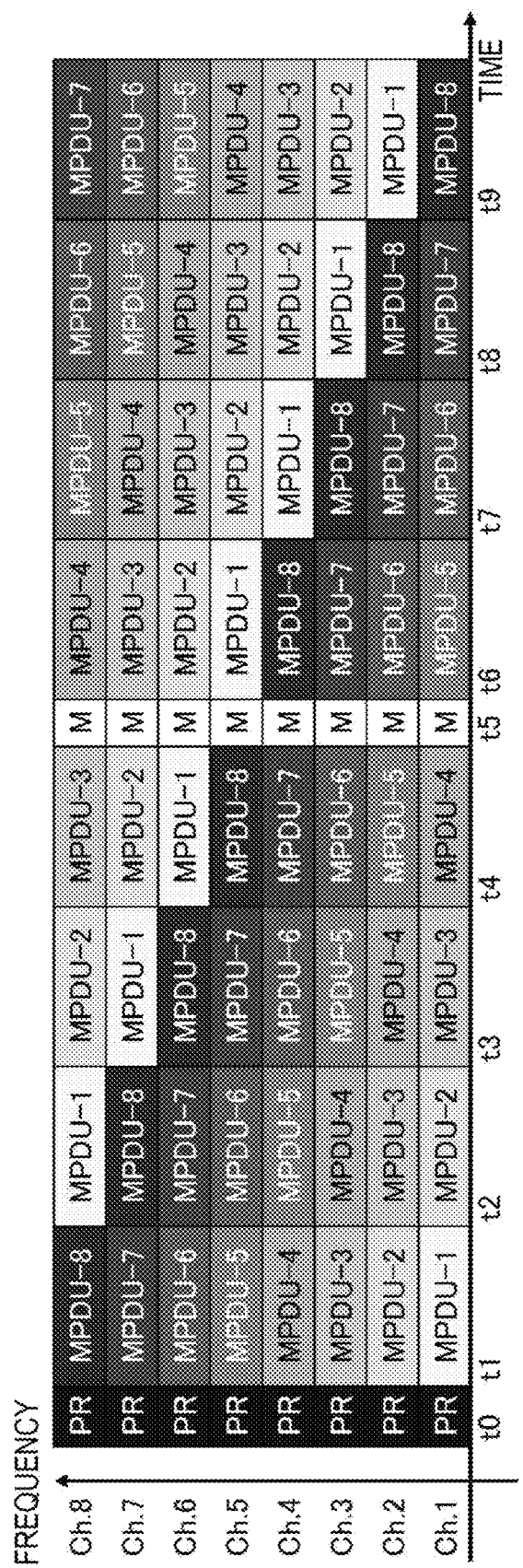
FIG. 6 is a diagram illustrating a modification of the multi-channel aggregation frame.

FIG. 6 illustrates a modification of the multi-channel aggregation frame, according to the present embodiment.

In FIG. 6, similarly to FIG. 5, a frame configuration example is illustrated in a case where communication is performed by aggregating, as one frame, eight MPDUs from the MPDU-1 to MPDU-8 as one frame with use of a multi-channel including eight frequency channels from channel (Ch) 1 to channel 8. Furthermore, in each channel (Ch.1 to Ch.8), a predetermined preamble (PR) is followed by the eight MPDUs, but the order of aggregating the MPDU-1 to MPDU-8 is made different for each channel in a manner such that the MPDUs of respective channels do not overlap each other at the same time. For convenience, all the MPDUs are drawn with the same information length, but the MPDUs may be configured as variable length subframes.

However, the frame configuration illustrated in FIG. 6 differs from the frame configuration example illustrated in FIG. 5 in that a mid-amble (M) is inserted in the middle of the frame of each channel. In FIG. 6, the mid-amble is inserted between the fourth and fifth MPDUs that are aggregated in each channel. On the reception side, there is an advantage that accuracy of signal detection and demodulation can be maintained by performing phase correction and resynchronization in the middle of an aggregated long payload portion by using this mid-amble.

Figure 7:
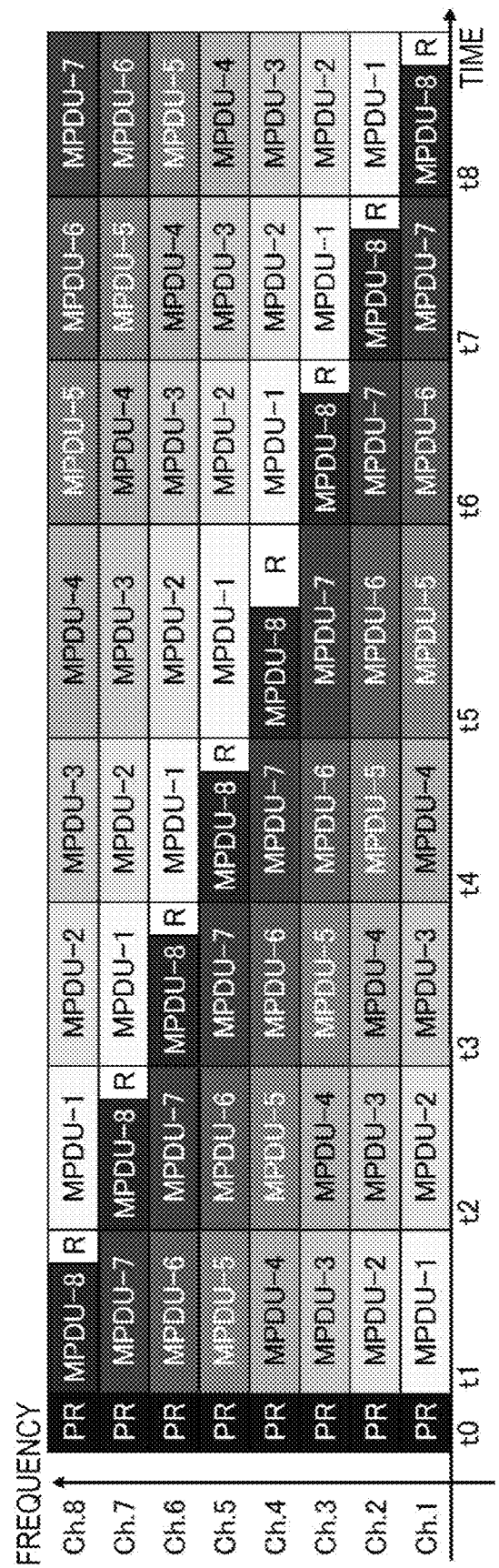
FIG. 7 is a diagram illustrating another modification of the multi-channel aggregation frame.

FIG. 7 illustrates another modification of the multi-channel aggregation frame, according to the present embodiment.

Also in FIG. 7, similarly to FIGS. 5 and 6, a frame configuration example is illustrated in a case where communication is performed by aggregating, as one frame, eight MPDUs from the MPDU-1 to MPDU-8 with use of a multi-channel including eight frequency channels from channel (Ch) 1 to channel 8. Furthermore, in each channel (Ch.1 to Ch.8), a predetermined preamble (PR) is followed by the eight MPDUs, but the order of aggregating the MPDU-1 to MPDU-8 is made different for each channel in a manner such that the MPDUs of respective channels do not overlap each other at the same time. For convenience, all the MPDUs are drawn with the same information length, but the MPDUs may be configured as variable length subframes.

However, in the frame configuration example illustrated in FIG. 7, there is a feature in that an RS slot (R) is included for receiving a reply of a Resend Request (continuation request) signal requesting continuation of transmission of the multi-channel aggregation frame from the reception side at the end of a specific MPDU in the frame in each channel. In the example illustrated in FIG. 7, the RS slot (R) is included at the end of the MPDU-8 that is aggregated in each channel. By including the RS slot (R) in the padding portion at the end of the MPDU-8, there is an advantage that the multiple MPDUs can be efficiently aggregated.

Furthermore, since the order of aggregating the MPDUs is made different for each channel so that the MPDUs of respective channels do not overlap each other at the same time, the timing of the end of the MPDU-8 is different for each channel. In the example illustrated in FIG. 7, the RS slot (R) of the Ch.8 arrives first, and then the timing of the RS slot (R) arrives in the order of the Ch.7, Ch.6, Ch.5, Ch.4, Ch.3, Ch.2, and Ch.1. Thus, there is an advantage that, if collection of error-free subframes can be completed, the reception side can notify the transmission side of reception completion of the subframes by stopping the reply of the Resend Request signal in the RS slot.

Note that, in the frame configuration example illustrated in FIG. 7, the mid-amble may be used similarly to FIG. 6, or a configuration may be adopted in which the RS slots (R) are arranged before and after the mid-amble.

Figure 8:
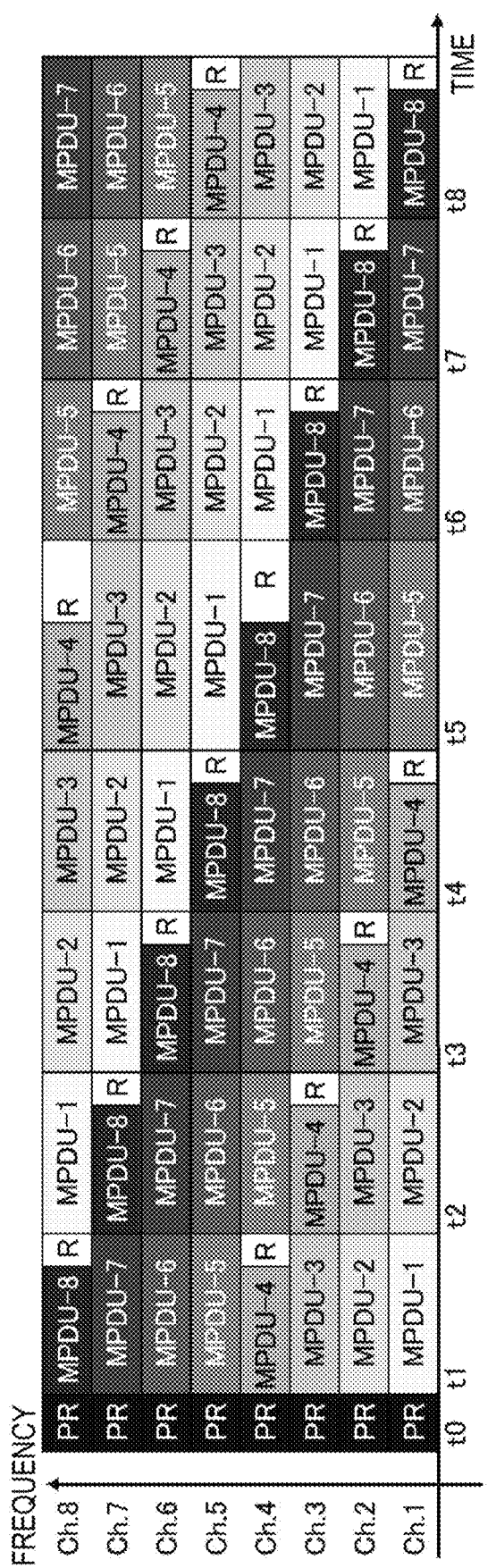
FIG. 8 is a diagram illustrating yet another modification of the multi-channel aggregation frame.

FIG. 8 illustrates yet another modification of the multi-channel aggregation frame, according to the present embodiment.

In FIG. 8, similarly to FIG. 7, a frame configuration example is illustrated in a case where communication is performed by aggregating, as one frame, eight MPDUs from the MPDU-1 to MPDU-8 in different order with use of a multi-channel including eight frequency channels from channel (Ch) 1 to channel 8. Furthermore, in each channel, at the end of a specific MPDU in the frame, the RS slot (R) is included for receiving a reply of the Resend Request signal requesting continuation of transmission of the multi-channel aggregation frame from the reception side.

However, in the frame configuration example illustrated in FIG. 7, the RS slot (R) exists only at the end of one MPDU in each channel, whereas in the frame configuration example illustrated in FIG. 8, there is a main feature in that the RS slot (R) is arranged at the end of multiple MPDUs in each channel.

In a case where the RS slot (R) exists only at the end of one MPDU in each channel as in the frame configuration example illustrated in FIG. 7, in a case where a certain channel is already in use by another communication device or a network allocation vector (NAV) is set, there is a possibility that the Resend Request signal cannot be transmitted on that channel to the transmission side. On the other hand, in a case where the RS slot (R) is arranged at the end of multiple MPDUS in each channel as in the frame configuration example illustrated in FIG. 8, there is an advantage that, even in a case where the reply of the Resend Request signal cannot be made in one RS slot (R) on a certain channel, the reception side is enabled to make the reply at the same timing by using the RS slot (R) on another channel.

In the example illustrated in FIG. 8, specifically, the RS slot (R) is arranged at the end of the two MPDUS, the MPDU-4 and MPDU-8 that are aggregated in each channel. The timing of the end of the MPDU-4 and MPDU-8 is different for each channel. The RS slots (R) of the Ch.4 and Ch.8 arrive first, and then the RS slots (R) of the Ch.3 and Ch.7 arrive. Thus, when the collection of error-free subframes can be completed in the reception side, even if the channel is used, or the NAV is set, at the timing of the end of either the MPDU-4 or MPDU-8, the reply of the Resend Request signal is stopped in the RS slot at the end of the other MPDU, whereby it is possible to notify the transmission side of the reception completion of all the subframes. As a result, the frequency channel occupied for the transmission of the multi-channel aggregation frame can be made reusable at an earlier timing, so that there is an advantage that the transmission efficiency is improved.

Figure 9:
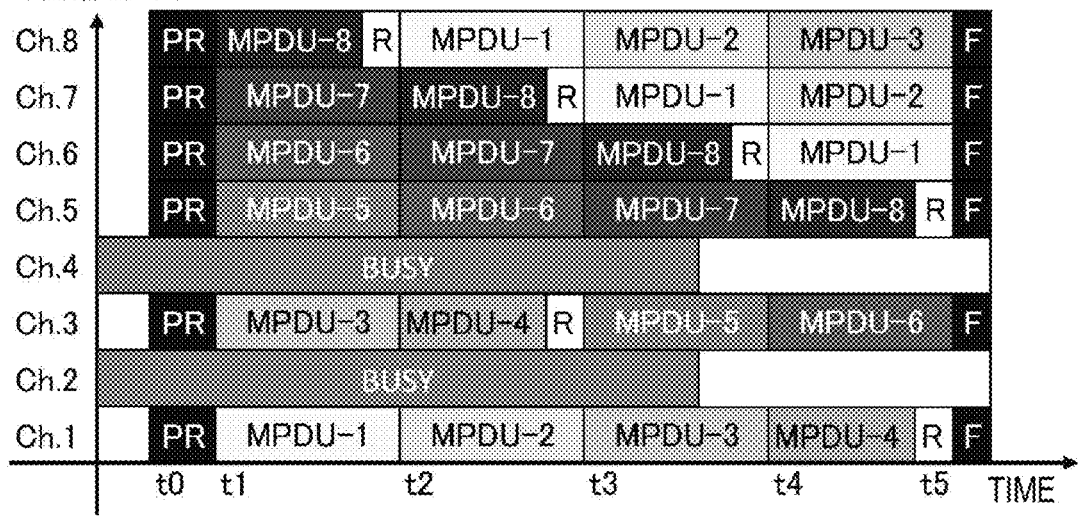
FIG. 9 is a diagram illustrating a frame configuration example in a case where the multi-channel aggregation frame ends in the middle.
Figure 10:
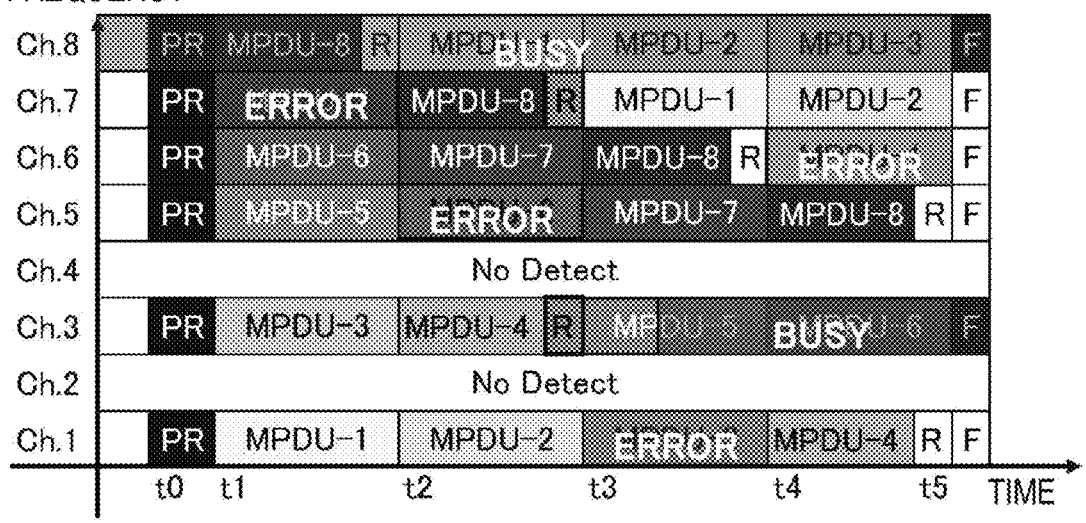
FIG. 10 is a diagram illustrating an operation example of a reception side of the multi-channel aggregation frame.

FIG. 9 illustrates a frame configuration example in a case where the multi-channel aggregation frame ends in the middle, according to the present embodiment. Here, the multi-channel aggregation frame having the frame configuration illustrated in FIG. 8 is sequentially transmitted from the transmission side, and on the other hand, the reception side stops the reply of the Resend Request signal when the subframes can be collected early, whereby the transmission of the multi-channel aggregation frame is ended. However, it is assumed that the reception side performs reception operation of the multi-channel aggregation frame as illustrated in FIG. 10 (described later).

In the example illustrated in FIG. 9, the transmission side is supposed to transmit the multi-channel aggregation frame having the frame configuration illustrated in FIG. 8; however, the channels Ch.2 and Ch.4 are not used that are unavailable due to the Busy state at that time (time to), but the Ch.1, Ch.3, and Ch.5 to Ch.8 are used to transmit the aggregation frame of each channel in accordance with a predetermined sequence.

Specifically, the transmission side, after the time t1, performs aggregation in order from the MPDU-1 in the Ch.1, performs aggregation in order from the MPDU-3 in the Ch.3, performs aggregation in order from the MPDU-5 in the Ch.5, performs aggregation in order from the MPDU-6 in the Ch.6, performs aggregation in order from the MPDU-7 in the Ch.7, and performs aggregation in order from the MPDU-8 in the Ch.8, and the aggregation frames each are transmitted. Transmission is performed of the multi-channel aggregation frame excluding a frequency channel that may cause interference in communication of another network, on the transmission side, whereby coexistence with a surrounding network can be implemented.

Then, in a case where the reply of the Resend Request signal from the reception side is not made continuously for a predetermined number of times, that is, with the passage of time t5, the transmission side stops transmission of the frame. Furthermore, the transmission side transmits a predetermined Finish signal (F) on each of channels Ch.1, Ch.3, and Ch.5 to Ch.8 for notification that the transmission line has become reusable by another communication device.

FIG. 10 illustrates an operation example of the reception side that performs reception processing to the multi-channel aggregation frame, according to the present embodiment. Here, the multi-channel aggregation frame having the frame configuration illustrated in FIG. 8 is sequentially transmitted from the transmission side, and on the other hand, the reception side stops the reply of the Resend Request signal when all the subframes can be collected early, whereby the transmission of the multi-channel aggregation frame is ended. However, it is assumed that, as illustrated in FIG. 9, the transmission side does not use the channels Ch.2 and Ch.4 that are unavailable due to the Busy state at the time of starting transmission (time to), but uses the Ch.1, Ch.3, and Ch.5 to Ch.8 to transmit the aggregation frame of each channel in accordance with a predetermined sequence.

On the reception side, since it is known in advance that the multi-channel aggregation frame is transmitted from the transmission side, operation of reception is performed on all the channels from the channels Ch.1 to Ch.8.

However, the transmission side does not perform transmission on the channels Ch.2 and Ch.4 that are unavailable at that time (time to) in the first place. For this reason, the reception side cannot receive a signal from the preamble (PR) on the channels Ch.2 and Ch.4 (No Detect).

Furthermore, since the channel Ch.8 is in the Busy state, used around the reception side at that time (time t0), the reception side cannot receive the signal from the preamble (PR), so that subframes transmitted after the time t1 cannot be received correctly.

Moreover, since an error is included in a received subframe (MPDU-7) received at the time t1 in the channel Ch.7 in which the preamble (PR) is detected and the subframe can be detected, the reception side detects the error by the FCS at the end of the subframe, and is in error.

Thus, in the interval of the time t1, the reception side can only collect the MPDU-1 transmitted on the Ch.1, the MPDU-3 transmitted on the Ch.3, the MPDU-5 transmitted on the Ch. 5, and the MPDU-6 transmitted on the CH. 6. Also, in the Ch.8 in which reception cannot be made since the MPDU-8 in which the RS slot (R) is arranged is in the Busy state, and in the Ch.4 in which the signal cannot be detected including the MPDU-4 in which the RS slot (R) is arranged, the reception side cannot make the reply.

However, the transmission side predicts such a situation of the reception side, and operates to end the transmission only in a case where the reply of the Resend Request signal is not made continuously for the predetermined number of times with a margin in advance even if the reply of the Resend Request signal is not made.

As a result, the transmission side continuously transmits the next subframe also in the interval of time t2, so that the reception side can collect the subframes. Furthermore, even if the reception side cannot make the reply of the Resend Request signal to the transmission side on the channel where the RS slot (R) is arranged, the subframe is continuously sent in the subsequent time interval, so that there is a possibility that all the subframes can be collected.

On the reception side, the MPDU-2 of the Ch.1 for which synchronization is acquired by the preamble, the MPDU-4 of the Ch.3, the MPDU-6 of the Ch.5, the MPDU-7 of the Ch.6, and the MPDU-8 of the Ch.7 can be received continuously also in the interval of the time t2. Then, at this time, all the subframes from the MPDU-1 to MPDU-8 are present.

However, from the fact that the RS slot (R) for making the reply of the Resend Request signal exists before the end of the MPDU-2 and MPDU-7 that are unreached subframes, or processing delay of decoding, the reception side returns the Resend Request signal at that timing. As a result, in the interval at the time t2, the reception side returns the Resend Request signal to the transmission side in each of the RS slot (R) arranged at the end of the MPDU-4 received in the Ch.3 and the RS slot (R) arranged at the end of the MPDU-8 received in the Ch.7.

On the transmission side, in response to receiving the Resend Request signal from the reception side, the next subframe is continuously sent also in the interval at the time t3. On the other hand, even if the reception side cannot collect, for example, the MPDU-6 of the Ch.5 in the interval of time t3, all the subframes have been collected by the previous time, and all the subframes from the MPDU-1 to MPDU-8 are present. Thus, the reception side does not make the reply of the Resend Request signal in the RS slot (R) arranged at the end of the MPDU-8 sent in the Ch.6 in this interval, and also in the following interval of t4, does not make the reply of the Resend Request signal in either the RS slot (R) arranged at the end of the MPDU-4 sent in the Ch.1 or the RS slot (R) arranged at the end of the MPDU-8 sent in the Ch.5.

On the transmission side, after the time t3, in a case where the Resend Request signal is not continuously received for the predetermined number of times in the RS slot (R), the transmission of the frame is stopped, so that the transmission of the frame is stopped with a delay after the reception side stops the transmission of the Resend Request signal. In the frame configuration example illustrated in FIG. 9, since the Resend Request signal is not received twice in succession in the RS slot (R) after the time t3, the transmission side stops the transmission of the frame with the passage of the time t5, and transmits the predetermined Finish signal (F) on all the channels Ch.1, Ch.3, and Ch.5 to Ch.8 used for the transmission of the multi-channel aggregation frame (described above). Then, a surrounding communication device can grasp that the transmission line is in a reusable state in each channel that receives the Finish signal (F) in each channel.

Thus, the highly reliable data communication can be implemented while the transmission efficiency is improved, by performing transmission by further multiplexing in the frequency axis direction the aggregation frame in which the subframes are multiplexed in the time axis direction with use of the multi-channel aggregation frame illustrated in FIG. 8.

Figure 11:
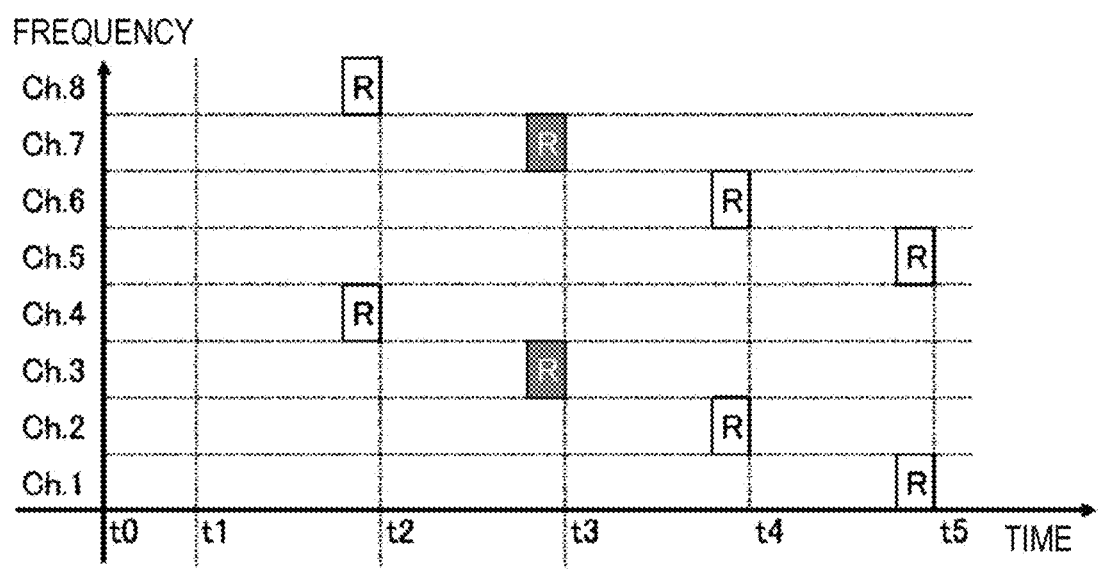
FIG. 11 is a diagram illustrating reception operation of a Resend Request signal.

FIG. 11 illustrates reception operation of the Resend Request signal on the transmission side, according to the present embodiment. Here, it is assumed that the transmission side transmits the multi-channel aggregation frame illustrated in FIG. 8 or 9, and in response to this, the reception side performs reception operation as illustrated in FIG. 10 to make the reply of the Resend Request signal, and stops the reply of the Resend Request signal.

On the transmission side, since the channel and timing of the RS slot (R) for returning the Resend Request signal are determined in advance, a setting is performed for receiving the Resend Request signal accordingly.

The transmission side performs waiting on the channels Ch.4 and Ch.8 at the time t2 of the first RS slot (R), performs waiting on the channels Ch.3 and Ch.7 at the time t3 of the next RS slot (R), and performs waiting on the channels Ch.2 and Ch.6 at the time t4 of the further next RS slot (R). Then, the transmission side stops the transmission of the multi-channel aggregation frame in a case where the Resend Request signal is not received continuously for the predetermined number of times.

The transmission side performs waiting on the channels Ch.4 and Ch.8 at the time t2 of the first RS slot (R). On the other hand, in the interval of the time t1, the reception side can only collect the MPDU-1 transmitted on the Ch.1, the MPDU-3 transmitted on the Ch.3, the MPDU-5 transmitted on the Ch.5, and the MPDU-6 transmitted on the CH. 6. For this reason, the reception side should make the reply of the Resend Request signal, but cannot return the Resend Request signal in either the Ch.8 in which reception cannot be made since the MPDU-8 in which the RS slot (R) is arranged is in the Busy state, or the Ch.4 in which the signal cannot be detected including the MPDU-4 in which the RS slot (R) is arranged. That is, the transmission side does not receive the Resend Request signal in either the Ch.4 or Ch.8 performing waiting. However, even if the reply of the Resend Request signal is not made in the first RS slot (R), the transmission side continues the transmission of the multi-channel aggregation frame until the reply of the Resend Request signal is not made continuously for the predetermined number of times (see FIG. 9).

The transmission side performs waiting on the channels Ch.3 and Ch.7 at the time t3 of the next RS slot (R). On the other hand, on the reception side, all the subframes from the MPDU-1 to MPDU-8 are present at this time, but from the fact that the RS slot (R) exists before the end of the MPDU-2 and MPDU-7 that are unreached subframes, or processing delay of decoding, the Resend Request signal is returned at that timing. Thus, the transmission side receives the Resend Request signal on the channels Ch.3 and Ch.7 performing waiting. As a result, the transmission side continuously transmits the next subframe on each channel even after the time t3 (see FIG. 9).

The transmission side performs waiting on the channels Ch.2 and Ch.6 at the time t4 of the further next RS slot (R), and performs waiting on the channels Ch.1 and Ch.5 at the time t5 of the further next RS slot (R). On the other hand, the reception side has collected all the subframes by the previous time, and does not make the reply of the Resend Request signal at any timing. Then, the transmission side does not receive the Resend Request signal continuously for the predetermined number of times.

Furthermore, the transmission side determines whether or not to stop the transmission of the multi-channel aggregation frame with a margin corresponding to a situation of the transmission line. Alternatively, in a case where a large number of RS slots (R) can be prepared in a plurality of channels, the transmission side may stop the transmission of the multi-channel aggregation frame immediately at the time when the Resend Request signal is no longer detected without receiving the signal continuously for the predetermined number of times.

In a case where it is determined that the transmission of the multi-channel aggregation frame is stopped, the transmission side transmits the predetermined Finish signal (F) on all the channels Ch.1, Ch.3, and Ch.5 to Ch.8 used for the transmission of the multi-channel aggregation frame (see FIG. 9), to notify the surrounding communication devices that the transmission line is in the reusable state.

FIG. 12 illustrates a configuration example of a multi-channel aggregation announcement frame, according to the present embodiment. The multi-channel aggregation announcement frame may be configured as a management frame or an action frame. When multi-channel aggregation is performed, the multi-channel aggregation announcement frame is transmitted for notification of performing the multi-channel aggregation from the transmission side (for example, a base station) to the reception side (for example, a terminal station) of the multi-channel aggregation frame, and for exchanging parameters of the multi-channel aggregation (see FIG. 3).

In the illustrated multi-channel aggregation announcement frame, a multi-channel aggregate announcement information element and an FCS for error detection and correction are added to a predetermined MAC header.

The multi-channel aggregate announcement information element includes parameters of: A-MPDU Max Size in which the maximum size of the A-MPDU is described; Aggregation Count indicating the number of aggregations of the MPDU; Aggregate Start Ch indicating the first channel number constituting the multi-channel aggregation frame; and Aggregation Channel Bitmap indicating, in a bitmap format, information of all channels for which multi-channel aggregation is executed from the channel with the first channel number, in addition to Type indicating the format of the information element, and Length indicating the information length of the information element.

The number of bits enabled in the Aggregation Channel Bitmap corresponds to the number of channels (the number of which the aggregation frame is further multiplexed in the frequency axis direction) used for transmission of the multi-channel aggregation frame.

In a case where the Aggregation Count and the Aggregation Channel Bitmap have the same number of bits enabled, the aggregated A-MPDU includes only one each of all the MPDUs. For example, if the numbers of bits enabled in the Aggregation Count and the Aggregation Channel Bitmap are both eight, one each of eight subframes, the MPDU-1 to MPDU-8, is included in the aggregation frame transmitted by each of eight channels in which multi-channel aggregation is executed (see FIG. 5, 8, or the like).

On the other hand, in a case where the Aggregation Count is less than the number of bits enabled in the Aggregation Channel Bitmap, it indicates that some MPDUS include a plurality of the MPDUs in the A-MPDU aggregated in one channel. For example, in a case where the number of bits enabled in the Aggregation Channel Bitmap is eight and the Aggregation Count is seven or less, some MPDUs include at least two or more of the MPDUs in the aggregation frame transmitted on each channel in which multi-channel aggregation is executed.

On the other hand, in a case where the Aggregation Count is greater than the number of bits enabled in the Aggregation Channel Bitmap, it indicates that not all the MPDUs are included (that is, there are MPDUs that are not transmitted on each channel) in the A-MPDUs aggregated in one channel. For example, in a case where the Aggregation Count is eight and the number of bits enabled in the Aggregation Channel Bitmap is seven or less, some of the eight subframes MPDU-1 to MPDU-8 that should be transmitted are not included in the aggregation frame transmitted on each channel in which multi-channel aggregation is executed.

Furthermore, the multi-channel aggregate announcement information element further include parameters such as Resend Slot Location indicating a position where the RS slot (R) that receives the reply of the first Resend Request signal is arranged, and Aggregation Direction indicating whether the order of aggregation is the up direction or the down direction. For example, in a case where the multi-channel aggregation frame illustrated in FIG. 8 is used, the Resend Slot Location indicates the Ch.4 and Ch.8, and the Aggregation Direction indicates the up direction.

FIG. 13 illustrates a configuration example of a multi-channel aggregation response frame, according to the present embodiment. This frame may be configured as a management frame or an action frame. When multi-channel aggregation is performed, the multi-channel aggregation response frame is transmitted for notification of approval of performing the multi-channel aggregation from the reception side (for example, a terminal station) to the transmission side (for example, a known station) of the multi-channel aggregation frame, and for exchanging parameters of the multi-channel aggregation (see FIG. 3).

In the illustrated multi-channel aggregation response frame, a multi-channel aggregate response information element and an FCS for error detection and correction are added to a predetermined MAC header.

The multi-channel aggregate response information element includes parameters of: A-MPDU Max Size in which the maximum size of the A-MPDU is described; Aggregation Count indicating the number of aggregations of the MPDU; and Aggregate Start Ch indicating the first channel number constituting the multi-channel aggregation frame, in addition to Type indicating the format of the information element, and Length indicating the information length of the information element.

Furthermore, the multi-channel aggregate response information element includes Available Ch. Bitmap indicating, in a bitmap format, information of channels currently available among all the channels for which the multi-channel aggregation is performed. On the transmission side, it is possible to perform setting so that the Resend Request signal can be reliably received, by adjusting an arrangement of Resend Slot on the basis of Available Ch. Bitmap included in the response information element received from the reception side. For example, the RS slot (R) may be arranged avoiding channels that are indicated to be unavailable by Available Ch. Bitmap.

Furthermore, the multi-channel aggregate response information element further includes parameters such as Resend Slot Location indicating a position of the RS slot (R)

receiving the reply of the first Resend Request signal, and Aggregation Direction indicating whether the order of aggregation is the up direction or the down direction. Values of these parameters may be the same as the parameters described in the multi-channel aggregate announcement information element previously received by the reception side.

FIG. 14 illustrates a configuration example of a slot for a reply of the Resend Request signal, according to the present embodiment.

For example, the slot for the reply of the Resend Request signal is configured as a time of at least 12 microseconds so that a signal of the conventional communication method can be detected, and is prepared as a time interval corresponding to three symbols of OFDMA.

In the example illustrated in FIG. 14, the slot for the reply of the Resend Request signal is configured as a time of 12 microseconds in which, in the reception side, 8 microseconds for performing transmission operation of a predetermined L-STF signal is added as the Resend Request signal between 2 microseconds of Receive Transmit Turnaround Time (RTTT) that is a switching time from reception to transmission and 2 microseconds of Transmit Receive Turnaround Time (TRTT) that is a switching time from transmission to reception.

FIG. 15 illustrates a configuration of the Finish signal, according to the present embodiment.

The illustrated Finish signal is a signal sent from the transmission side in a case where the transmission of the multi-channel aggregation frame is ended in the middle, and indicates that the transmission line can be reused by another communication device at a subsequent timing.

The Finish signal is preferably configured as a signal of a conventional communication method. For example, after a predetermined Reduced Interframe Space (RIFS) interval (2 microseconds) has elapsed, a predetermined L-STF signal (8 microseconds), a predetermined L-LTF signal (8 microseconds), and a predetermined L-SIG signal (4 microseconds) are included.

Note that, the predetermined L-SIG signal may indicate that there are no subframes thereafter by being configured with all bits set to 0.

Figure 16:
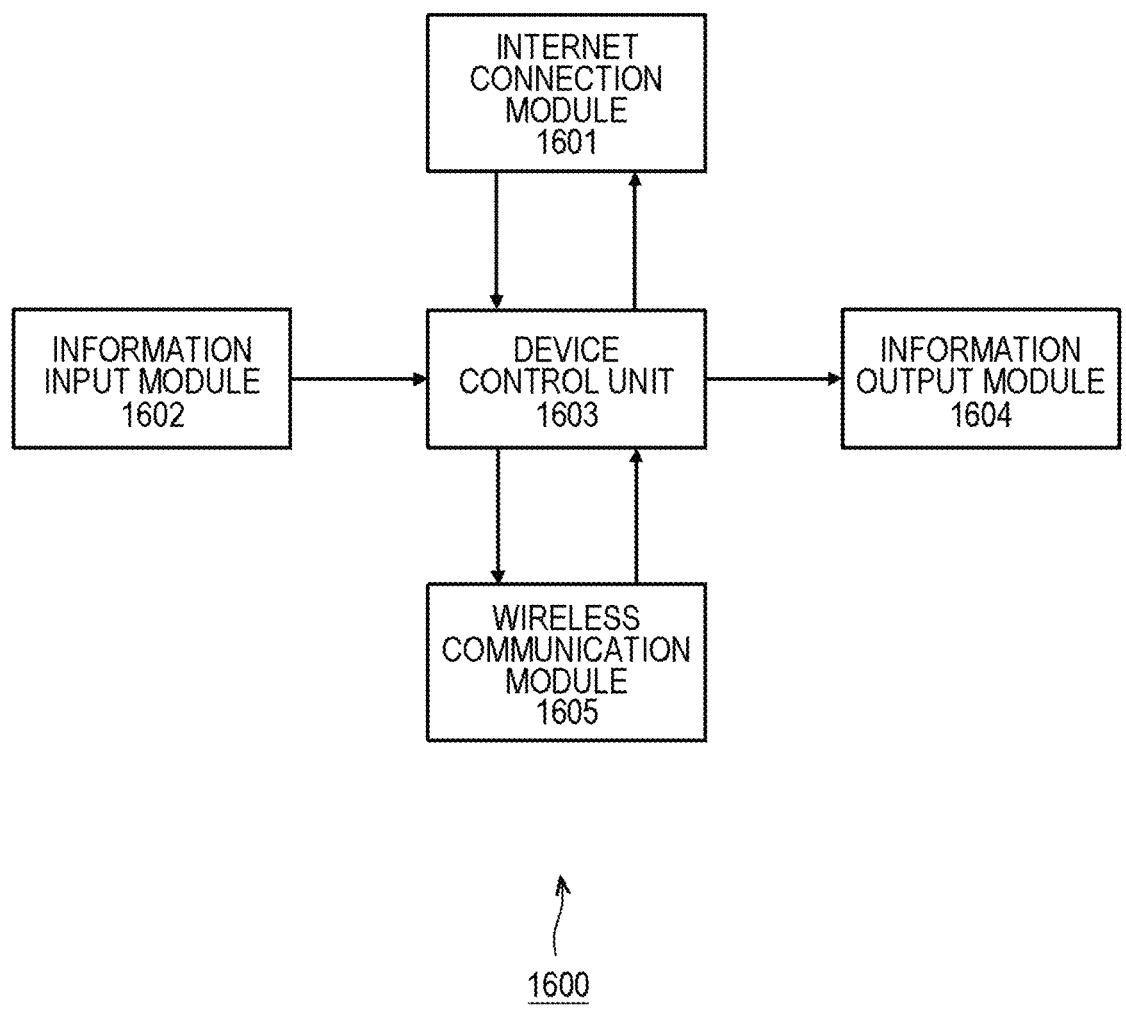
FIG. 16 is a diagram illustrating a configuration example of a communication device 16600.

FIG. 16 illustrates a configuration example of a communication device 1600 capable of wireless communication operation in the wireless LAN network (see FIG. 1) according to the present embodiment. It is assumed that the communication device 1600 operates as either or both of the transmission side and the reception side of the multi-channel aggregation frame (described above). The illustrated communication device 1600 includes an Internet connection module 1601, an information input module 1602, a device control unit 1603, an information output module 1604, and a wireless communication module 1605. However, the communication device 1600 may include only the minimum modules required as a communication terminal, and unnecessary portions may be simplified or not incorporated.

The Internet connection module 1601 implements functions such as a communication modem for connecting to the Internet network. The Internet connection module 1601 is installed, for example, in a case where the communication device 1600 operates as an access point.

The information input module 1602 is a functional module that inputs information for conveying an instruction from a user, and includes, for example, a push button, a keyboard, a touch panel, and the like.

The device control unit 1603 is a functional module for causing the communication device 1600 to operate as an access point or a terminal station intended by the user. The device control unit 1603 performs processing, for example, transmission control or reception control of the multi-channel aggregation frame, reception control or transmission control of the Resend Request signal, transmission control or reception control of the Finish signal, or the like.

The information output module 1604 is a functional module that outputs an operating state of the communication device 1600 and information acquired via the Internet. The information output module 1604 includes a display element (such as a display of a terminal possessed by the user), for example, a Light Emitting Diode (LED), a liquid crystal panel, an organic Electro Luminescence (EL) display, or the like, and displays necessary information for the user.

Furthermore, the information output module 1604 may include an acoustic element such as a speaker, and may further include a configuration that outputs information by voice.

The wireless communication module 1605 is a functional module for processing wireless communication in accordance with a predetermined communication standard. In the present embodiment, the wireless communication module 1605 performs, for example, transmission processing or reception processing of the multi-channel aggregation frame, reception processing or transmission processing of the Resend Request signal, transmission processing or reception processing of the Finish signal, and the like.

Figure 17:
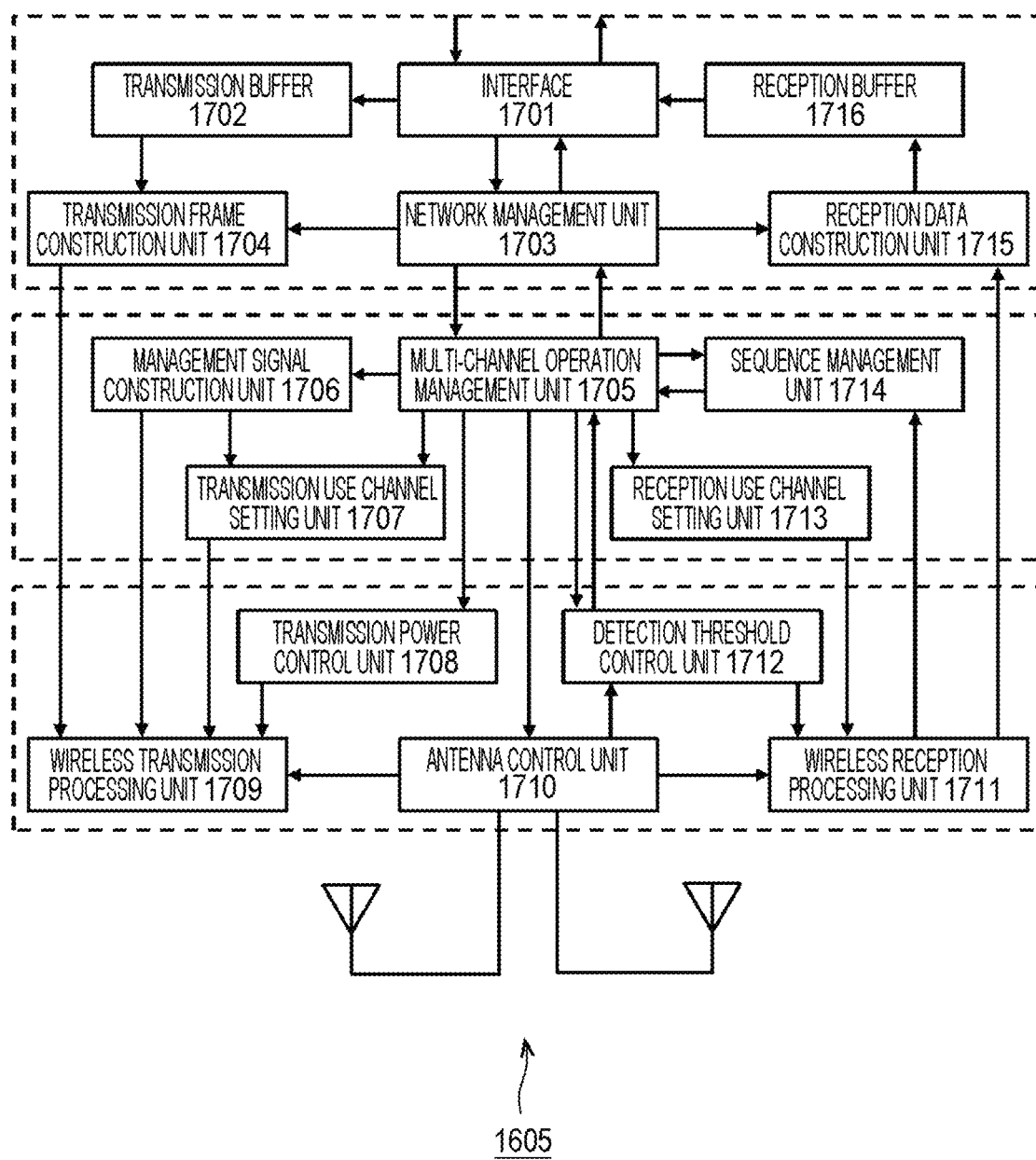
FIG. 17 is a diagram illustrating a functional configuration example of the inside of the wireless communication module 1605.

FIG. 17 illustrates a functional configuration example of the inside of the wireless communication module 1605 in the communication device 1600 illustrated in FIG. 16. The illustrated wireless communication module 1605 includes an interface 1701, a transmission buffer 1702, a network management unit 1703, a transmission frame construction unit 1704, a multi-channel operation management unit 1705, a management signal construction unit 1706, a transmission use channel setting unit 1707, a transmission power control unit 1708, a wireless transmission processing unit 1709, an antenna control unit 1710, a wireless reception processing unit 1711, a detection threshold control unit 1712, a reception use channel setting unit 1713, a sequence management unit 1714, a reception data construction unit 1715, and a reception buffer 1716.

The interface 1701 is a functional module for exchanging an input from the user, data from the Internet network, and information to the user in a predetermined signal format.

The transmission buffer 1702 is a functional module for temporarily storing an input from the user or a signal to be wirelessly transmitted, in a case where they are received from the interface 1701.

The network management unit 1703 is a functional module for managing address information and the like of a communication device included in a wireless network (for example, a BSS operated as an access point by the communication device 1600, or a BSS operated by an access point to which the communication device 1600 is connected). Furthermore, the network management unit 1703 is also a functional module for performing an Internet connection in a case where the communication device 1600 operates as an access controller or an Internet gateway.

The transmission frame construction unit 1704 is a functional module for constructing wireless transmission data as a data frame for wireless transmission.

The multi-channel operation management unit 1705 is a functional module that manages each of usage statuses of a plurality of frequency channels in the wireless LAN network according to the present embodiment. Specifically, the multi-channel operation management unit 1705 has a function of monitoring a status of an available frequency channel described in a request signal and a response signal, and immediately grasping the available channel. The request signal referred to here is, for example, the multi-channel aggregation announcement frame, and the response signal is, for example, the multi-channel aggregation response frame.

The management signal construction unit 1706 performs processing for constructing a management signal to be transmitted in the wireless LAN network according to the present embodiment. The management signal referred to here includes the Resend Request signal and the Finish signal. In a case where the communication device 1600 is the reception side of the multi-channel aggregation frame, the management signal construction unit 1706 prepares the Resend Request signal to be returned in the RS slot, and performs a function of setting a specific channel at a predetermined timing. Furthermore, in a case where the communication device 1600 is the transmission side of the multi-channel aggregation frame, the management signal construction unit 1706 performs control for stopping the transmission of the multi-channel aggregation frame and transmitting the Finish signal in a case where the Resend Request signal from the reception side is not detected.

The transmission use channel setting unit 1707 is a functional module for setting each channel for transmitting the multi-channel aggregation frame, the Resend Request signal, and the Finish signal transmitted from the communication device 1600. By setting the channel used for the transmission of the multi-channel aggregation frame excluding a frequency channel that may cause interference in communication of another network, coexistence with a surrounding network can be implemented.

The transmission power control unit 1708 is a functional module for controlling transmission power of a wireless signal in a case where a predetermined frame is transmitted from the communication device 1600. Specifically, the transmission power control unit 1708 controls the transmission power so that the signal does not reach an unnecessary radio wave reach range. In the present embodiment, the transmission power control unit 1708 performs control to transmit data by controlling the minimum necessary transmission power so that the transmission signal reaches the reception side with intended reception electric field strength. When the transmission power is appropriately controlled, it is possible to improve the transmission efficiency by space reuse while maintaining communication quality.

The wireless transmission processing unit 1709 converts the frame to be wirelessly transmitted into a baseband signal, further performs DA-conversion and processes the signal as an analog signal, and further performs up-conversion into a wireless frequency.

The antenna control unit 1710 includes a plurality of antenna elements connected together, and is a functional module that performs control of wirelessly transmitting the signal subjected to up-conversion by the wireless transmission processing unit 1709, and control of receiving a signal by the antenna elements.

The wireless reception processing unit 1711 is a functional module for performing reception processing of a header or data (payload) portion added thereafter in a case where a predetermined preamble signal is detected from signals received by the plurality of antenna elements.

The detection threshold control unit 1712 is a functional module having a signal detection level set so that a signal from a communication device existing within a range can be detected in a case where transmission power control is performed, and for controlling the wireless reception processing unit 1711 so that the signal can be detected with the minimum necessary threshold value. If the channel is currently in use, the wireless reception processing unit 1711 detects a signal of a predetermined detection level or higher.

The reception use channel setting unit 1713 is a functional module for setting a channel for receiving the multi-channel aggregation frame, the Resend Request signal, and the Finish signal from another communication device. In the case where the communication device 1600 is the reception side of the multi-channel aggregation frame, unless otherwise specified, the reception use channel setting unit 1713 sets the channel so that reception is performed on all available channels. Furthermore, even in a case where the communication device 1600 is the transmission side of the multi-channel aggregation frame, the reception use channel setting unit 1713 sets the channel so that reception is made on a specific channel at the timing of receiving the Resend Request signal.

The sequence management unit 1714 is a functional module that manages a sequence related to transmission and reception of the multi-channel aggregation frame.

In the case where the communication device 1600 is the reception side of the multi-channel aggregation frame, the sequence management unit 1714 performs operation of sequentially managing the sequence of the subframes aggregated in multi-channel by the multi-channel operation management unit 1705, and determines whether or not to stop the transmission of the Resend Request signal in a case where all the aggregated subframes are present. Furthermore, the sequence management unit 1714 manages the sequence of MPDUs stored in the A-MPDU following the preamble detected by the wireless reception processing unit 1711, in each channel.

Furthermore, in the case where the communication device 1600 is the transmission side of the multi-channel aggregation frame, the sequence management unit 1714 determines whether or not the Resend Request signal is no longer detected in a predetermined (or specified by the multi-channel aggregation announcement frame) RS slot (R), and stops the transmission of the multi-channel aggregation frame, by the Finish signal.

The reception data construction unit 1715 is a functional module for constructing original data by removing predetermined header information from the received subframe and extracting only a required data portion.

The reception buffer 1716 is a functional module for temporarily storing the extracted data portion on the basis of the sequence until all the subframes are present.

Figure 18:
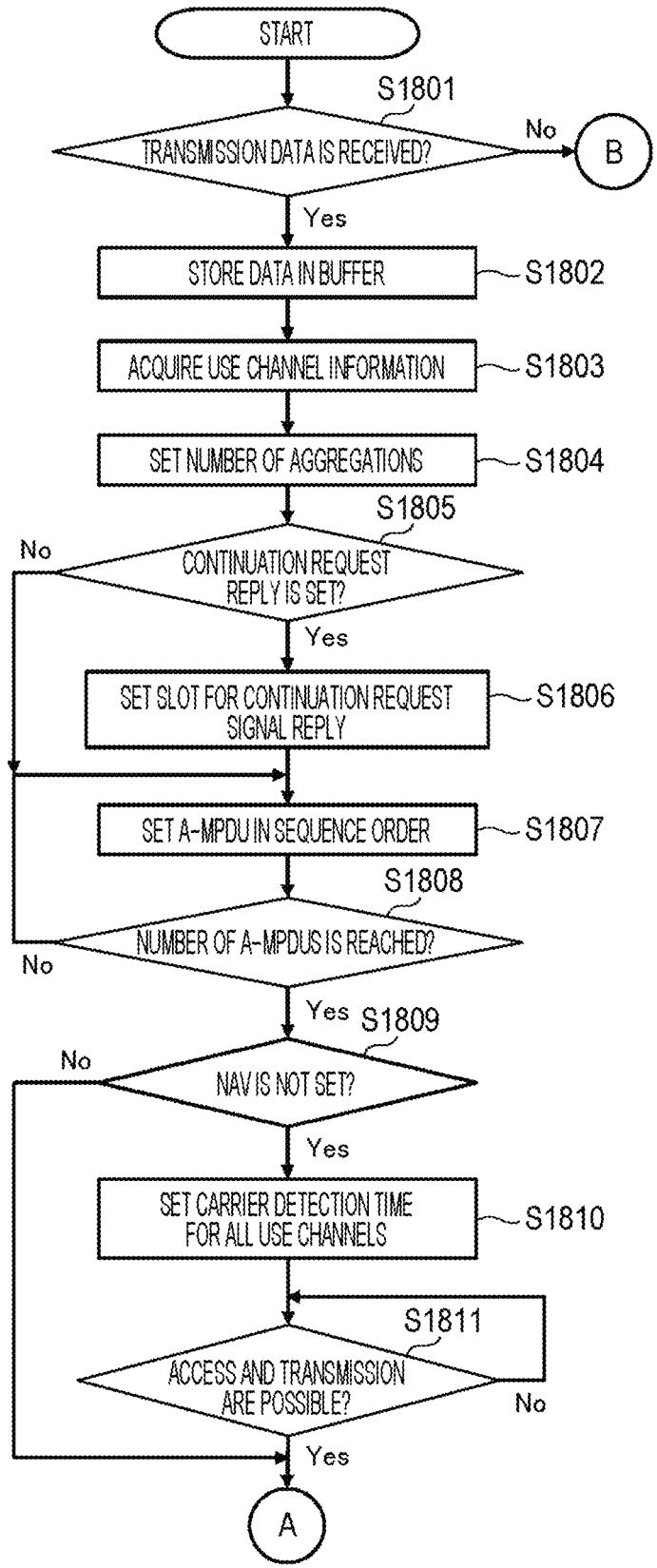
FIG. 18 is a flowchart illustrating operation (first half) of a transmission side of the multi-channel aggregation frame.
Figure 19:
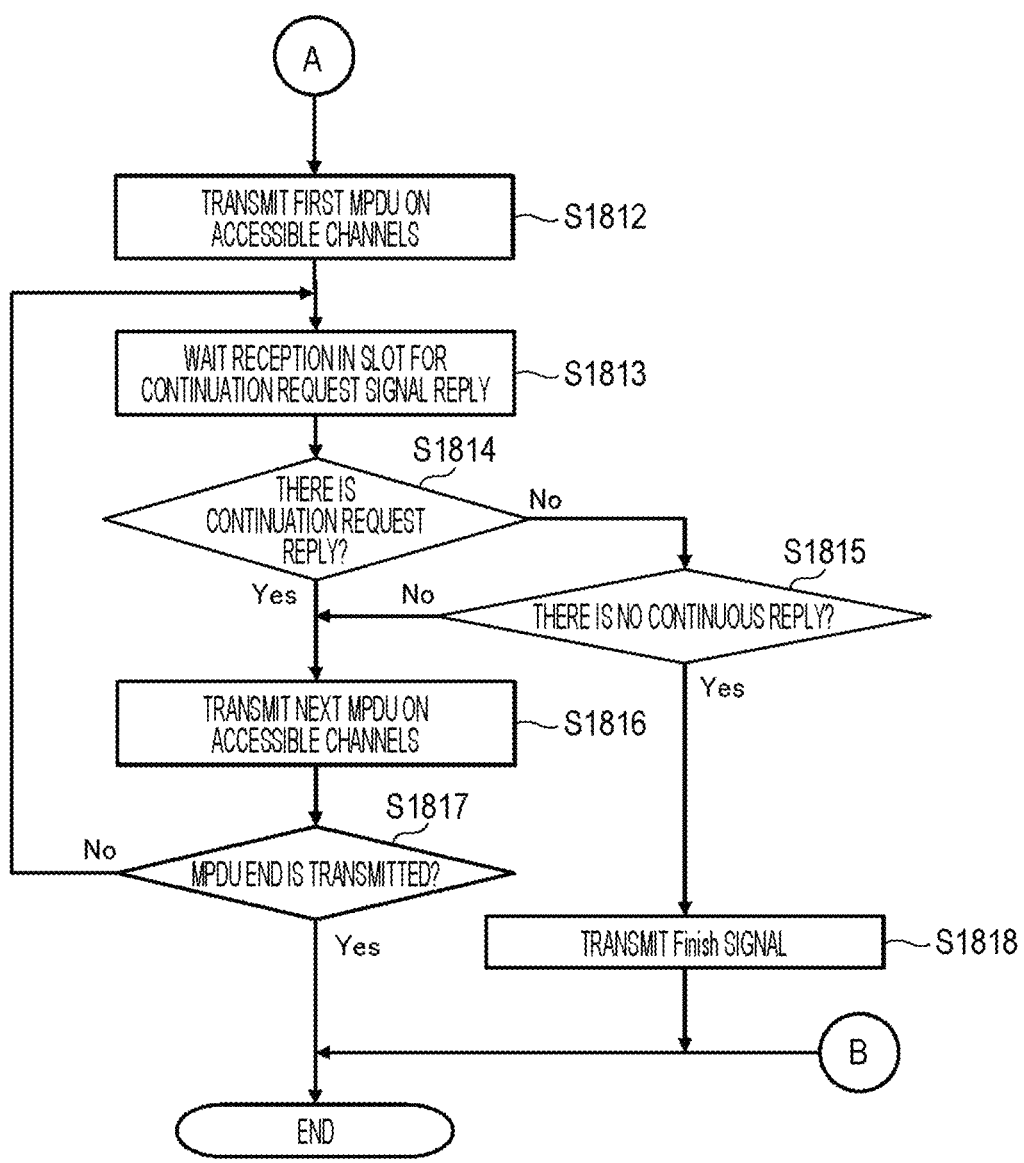
FIG. 19 is a flowchart illustrating the operation (second half) of the transmission side of the multi-channel aggregation frame.

FIGS. 18 and 19 illustrate, in the form of a flowchart, operation of the communication device 1600 (or the wireless communication module 1605) that is the transmission side of the multi-channel aggregation frame in the present embodiment.

First, when data to be transmitted is received from an upper layer application via interface 1701 (Yes in step S1801), the data is temporarily stored in the transmission buffer 1702 (step S1802). Note that, in a case where the data to be transmitted is not received (No in step S1801), all the subsequent processes are skipped, and this process ends without performing the transmission of the multi-channel aggregation frame.

Here, in a case where the transmission of the multi-channel aggregation frame is executed, the multi-channel operation management unit 1705 acquires information of currently available channels (step S1803), and the transmission frame construction unit 1704 sets an effective number of aggregations (step S1804). In consideration of coexistence with a surrounding network, it is preferable to perform channel access control to transmit the multi-channel aggregation frame excluding a frequency channel that may cause interference in communication of another network.

Furthermore, in a case where the reply is performed by the Resend Request (continuation request) signal (Yes in step S1805), the transmission use channel setting unit 1707 sets a specific channel as the RS slot for the reply of the Resend Request signal (step S1806).

As a result, the configuration of the multi-channel aggregation frame is determined for each use channel. Thus, the transmission frame construction unit 1704 configures A-MPDUs in the sequence order (for example, ascending order or descending order) of the MPDUs (step S1807) until the number of the A-MPDUs is reached (No in step S1808).

Until the number of A-MPDUs is reached (Yes in step S1808), the processing flow after configuring the A-MPDUS operates in parallel for each channel.

In a channel in which a network allocation vector (NAV) is not set in the surrounding communication device (Yes in step S1809), the multi-channel operation management unit 1705 sets a carrier detection time in accordance with a predetermined access control procedure, for example, CSMA-CA, for all use channels (step S1810). Then, if the carrier is not detected and access is possible in at least one channel (Yes in step S1811), the first MPDU constructed by the transmission frame construction unit 1704 is transmitted on all the channels determined to be accessible (step S1812).

Next, waiting is performed for the reception of the Resend Request signal in the RS slot for the continuation request reply set by the reception use channel setting unit 1713 (step S1813). In a case where the sequence management unit 1714 determines that there is a continuation request reply of the Resend Request signal (Yes in step S1814), or in a case where it is determined that no reply of the Resend Request signal is not repeated for a predetermined number of times (No in step S1815), transmission is continuously performed of the next MPDU constructed by the transmission frame construction unit 1704, on all channels determined to be accessible by the multi-channel operation management unit 1705 in step S1811 (step S1816).

Then, it is determined whether or not a predetermined aggregation frame has been transmitted up to the end of the MPDU (step S1817).

Here, in a case where the predetermined aggregation frame has not been transmitted up to the end of the MPDU (No in step S1817), the process returns to step S1813, and reception operation of the Resend Request signal is performed in the RS slot for the continuation request reply, by the sequence management unit 1714.

On the other hand, in a case where the predetermined aggregation frame has been transmitted up to the end of the MPDU (Yes in step S1817), the communication device 1600 ends the transmission processing of a series of multi-channel aggregation frames.

Furthermore, in a case where there is no reply of the Resend Request signal continuously in the RS slot for the continuation request reply over a predetermined period, that is, in a case where the sequence management unit 1714 determines that the Resend Request signal is no longer detected (Yes in step S1815), a predetermined Finish signal is transmitted by the management signal construction unit 1706 (step S1818), and the communication device 1600 ends the transmission processing of a series of aggregation frames.

Figure 20:
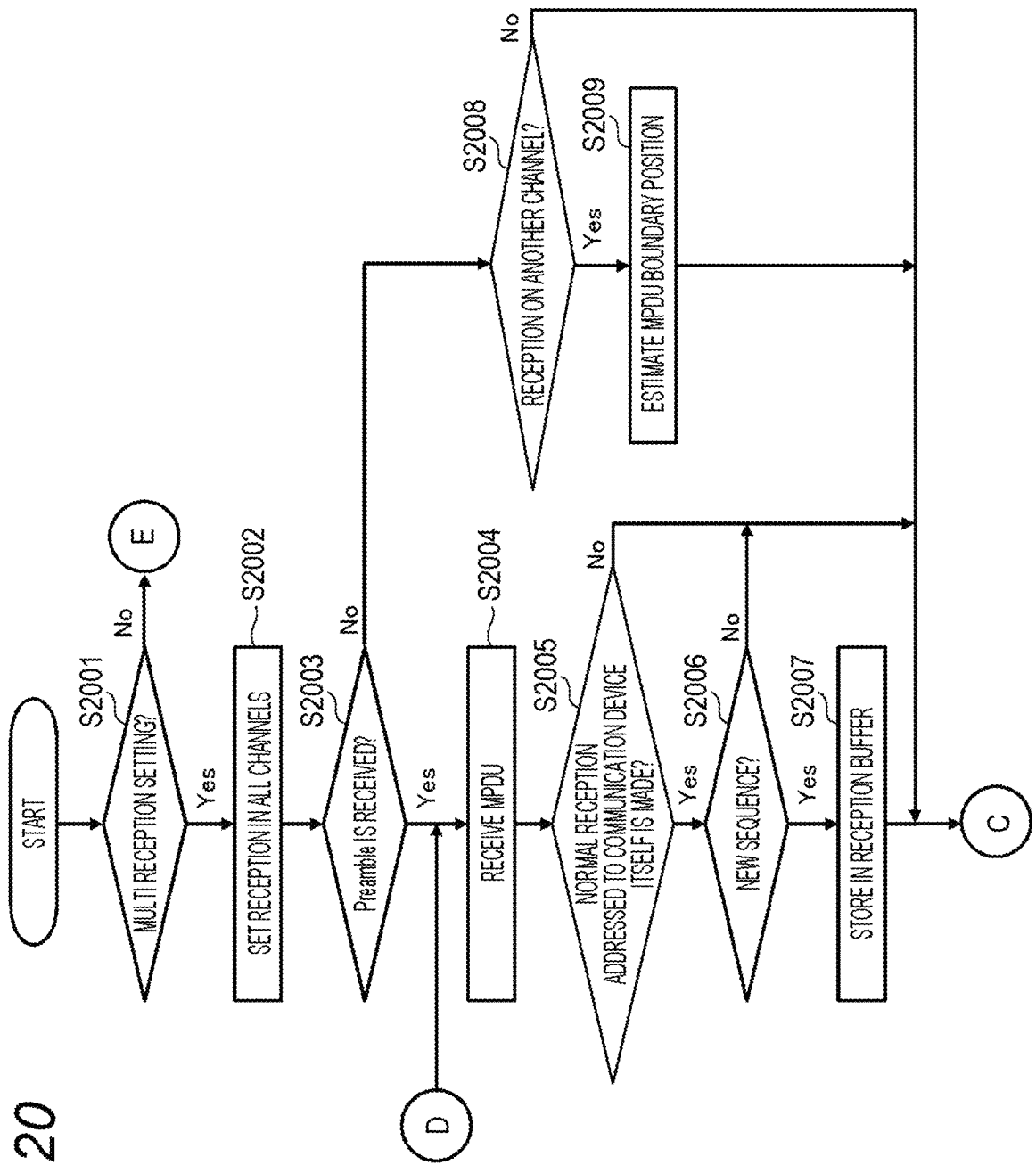
FIG. 20 is a flowchart illustrating operation (first half) of the reception side of the multi-channel aggregation frame.
Figure 21:
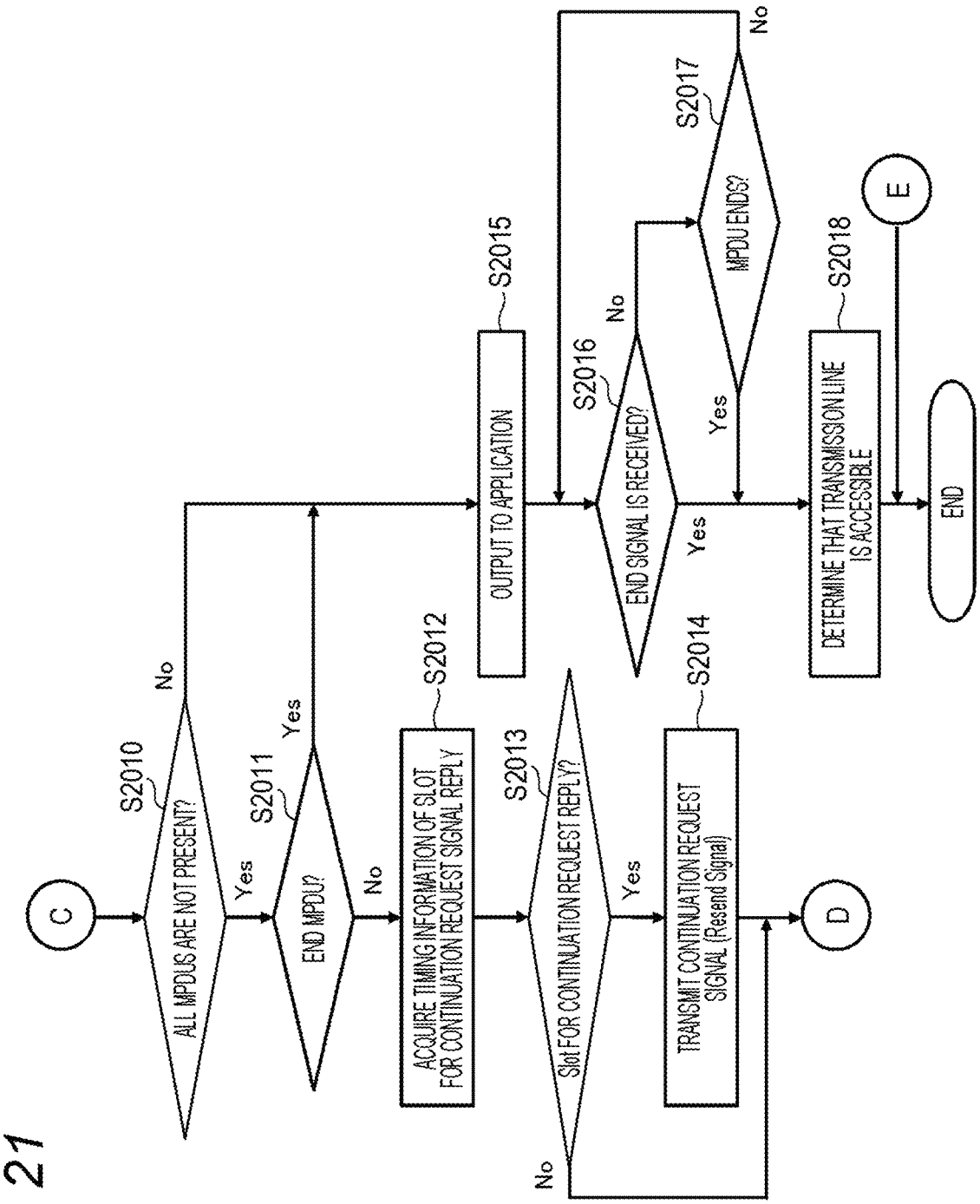
FIG. 21 is a flowchart illustrating the operation (second half) of the reception side of the multi-channel aggregation frame.

FIGS. 20 and 21 illustrate, in the form of a flowchart, operation of the communication device 1600 (or the wireless communication module 1605) that is the reception side of the multi-channel aggregation frame in the present embodiment.

In a case where there is a reception setting of the multi-channel aggregation frame by the reception use channel setting unit 1713 (Yes in step S2001), the reception use channel setting unit 1713 sets reception in all predetermined channels through exchange or the like of the multi-channel aggregation announcement frame and the multi-channel aggregation response frame (step S2002), and the subsequent processing flow operates in parallel for each channel.

Then, in a case where the wireless reception processing unit 1711 receives a predetermined preamble on a specific channel (Yes in step S2003), operation of continuously receiving MPDUs that follow thereafter is performed by the sequence management unit 1714 (step S2004). The specific channel referred to here is any channel specified to constitute the multi-channel aggregation frame, such as the multi-channel aggregation announcement frame or the multi-channel aggregation response frame.

Next, normal reception is made as a subframe addressed to the communication device itself (Yes in step S2005) and if the MPDU has a new sequence number (Yes in step S2006), the reception data constructed by the reception data construction unit 1715 is temporarily stored in the reception buffer 1716 (step S2007). Furthermore, in a case where the subframe is addressed to another communication device (No in step S2005), or the MPDU has a sequence number that has already been received (No in step S2006), the subframe is not stored in the reception buffer 1716, and discarded.

Furthermore, even if the predetermined preamble is not received on the specific channel (No in step S2003), in a case where the wireless reception processing unit 1711 receives the preamble on another channel (Yes in step S2008), a timing of a boundary position of the MPDU is estimated on the basis of the preamble received on the other channel (step S2009), and the reception may be performed at the timing of the next MPDU.

Then, in a case where the sequence management unit 1714 determines that all the subframes of the multi-channel aggregation frame are not present (Yes in step S2010), and it is not at timing when reception has been made up to the MPDU at the end of the A-MPDU (No in step S2011), the transmission use channel setting unit 1707 attempts to acquire timing information of the RS slot (R) for the continuation request reply (step S2012), and when the timing of the RS slot (R) acquired arrives (Yes in step S2013), performs transmission of the Resend Request signal (step S2014). As a result, in a case where all the subframes are not present, the process returns to step S2004, and the reception of the multi-channel aggregation frame is continued.

On the other hand, in a case where all the subframes of the multi-channel aggregation frame are present (No in step S2010), or in a case where reception has been made up to the MPDU at the end of the A-MPDU (Yes in step S2011), the data that has been collected so far and stored in the reception buffer 1716 is output to the upper layer application via the interface 1701 (step S2015).

Moreover, in a case where the Finish signal is received from the transmission side of the multi-channel aggregation frame (Yes in step S2016), or in a case where it is determined by the sequence management unit 1714 that it is a timing when the A-MPDU ends (Yes in step S2017), the multi-channel operation management unit 1705 determines that the wireless transmission line is in a vacant state and can be accessed (step S2018), and ends this process.

Figure 22:
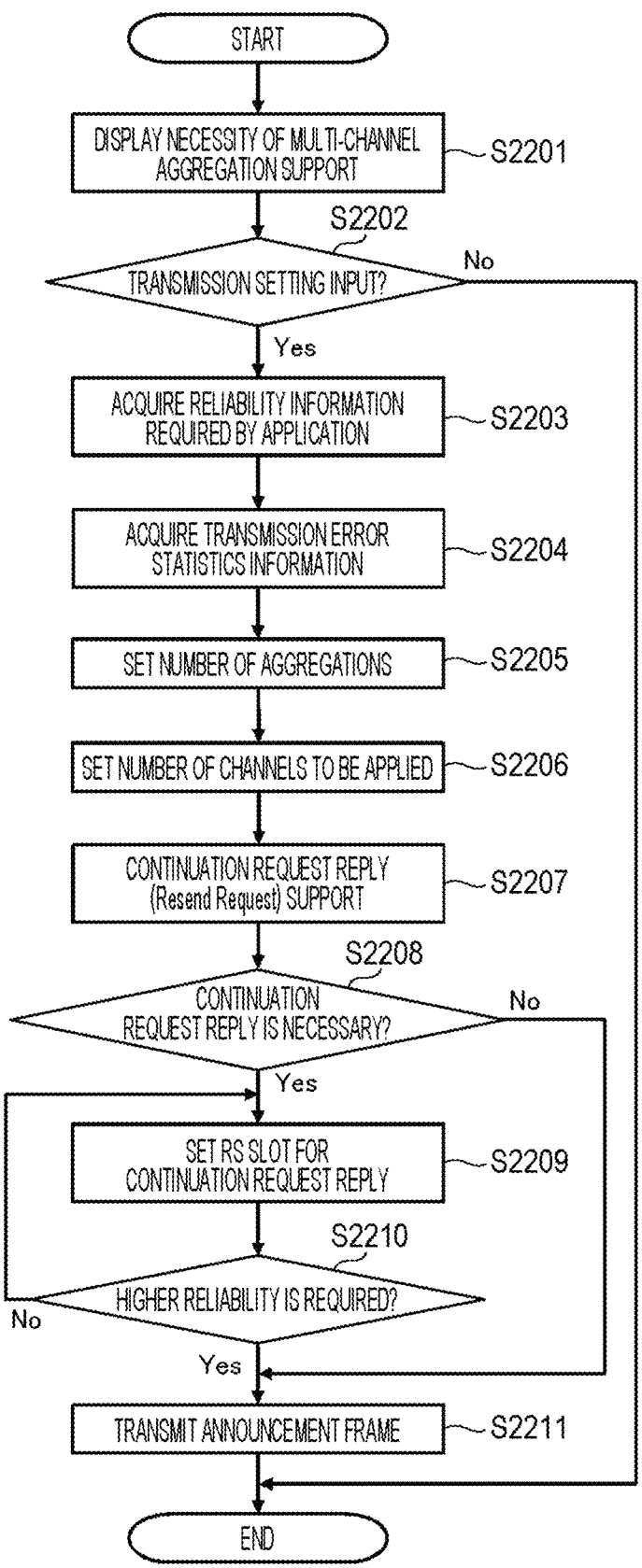
FIG. 22 is a flowchart illustrating operation of announcing parameters to be used prior to performing multi-channel aggregation.

FIG. 22 illustrates, in the form of a flowchart, operation in which the communication device 1600 (or the wireless communication module 1605) that is the transmission side of the multi-channel aggregation frame announces parameters to be used prior to performing the multi-channel aggregation in the present embodiment.

First, the necessity of supporting the multi-channel aggregation of the communication device 1600 is displayed by using the information output module 1604 (step S2201), and the necessity of transmission setting of the multi-channel aggregation is confirmed to the user.

Here, in a case where an input from the user that the transmission setting of the multi-channel aggregation is required is made through the information input module 1602 or the like (Yes in step S2202), the multi-channel operation management unit 1705 acquires reliability information required by the application (step S2203), and also acquires information on a transmission error in a communication network used by the communication device 1600 (step S2204). Then, the transmission use channel setting unit 1707 sets the number of aggregations of the multi-channel aggregation on the basis of the reliability information, the transmission error information, and the like (step S2205), and further sets the number of channels to be aggregated (step S2206). Note that, in a case where the input from the user that the transmission setting of the multi-channel aggregation is required is not made through the information input module 1602 or the like (No in step S2202), all subsequent processing steps are skipped, and this process ends.

Next, the management signal construction unit 1706 acquires whether or not a reply by the Resend Request (continuation required) signal is supported (step S2207). Then, in a case where it is determined that the reply by the continuation request signal from the reception side is necessary (Yes in step S2208), the management signal construction unit 1706 sets the RS slot for returning the continuation request signal (step S2209). Furthermore, in a case where higher reliability is required (Yes in step S2210), the process returns to step S2209, and the number of RS slot settings is added.

For example, when it is tried to aggregate eight MPDUs from the MPDU-1 to MPDU-8 and transmit the multi-channel aggregation frame, the RS slot is initially arranged at the end of MPDU-8, but in a case where higher reliability is required depending on an occurrence status of a transmission error, or the like, the RS slot is additionally arranged at the end of the MPDU-4.

Then, the communication device 1600 transmits the multi-channel aggregation announcement frame in which the parameters of the multi-channel aggregation are described to the reception side (step S2211).

Note that, FIG. 22 illustrates an operation procedure in which the parameters of the multi-channel aggregation are set in response to the input from the user and the announcement frame is transmitted; however, the operation performed by the transmission side prior to the transmission of the multi-channel aggregation frame is not limited to the above. For example, the parameters may be changed at arbitrary timings depending on changes in the environment of the transmission line and the degree of channel congestion, and the announcement frame may be transmitted each time the parameters are changed.

Figure 23:
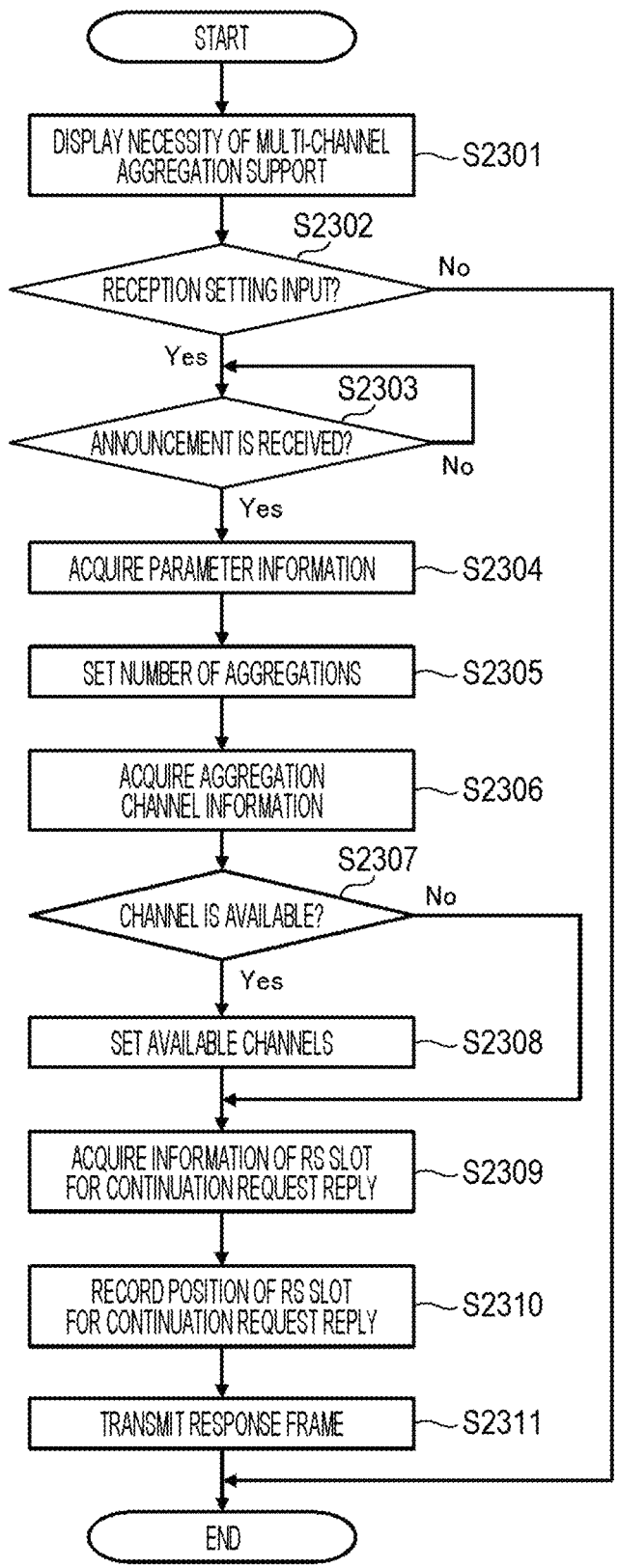
FIG. 23 is a flowchart illustrating operation of performing response of the parameters used prior to performing the multi-channel aggregation.

FIG. 23 illustrates, in the form of a flowchart, operation in which the communication device 1600 (or the wireless communication module 1605) that is the reception side of the multi-channel aggregation frame performs response of the parameters to be used prior to performing the multi-channel aggregation in the present embodiment.

First, the necessity of supporting the multi-channel aggregation of the communication device 1600 is displayed by using the information output module 1604 (step S2301), and the necessity of transmission setting of the multi-channel aggregation is confirmed to the user.

Here, in a case where an input from the user that the transmission setting of the multi-channel aggregation is required is made through the information input module 1602 or the like (Yes in step S2302), and further, the multi-channel aggregation announcement frame is received from the transmission side (Yes in step S2303), parameter information described in the received frame is acquired (step S2304). For the parameter information that can be acquired, refer to FIG. 12, for example. Then, the reception use channel setting unit 1713 sets the number of aggregations of the multi-channel aggregation (step S2305), and further acquires information of channels to be aggregated (step S2306). Note that, in a case where the input from the user that the transmission setting of the multi-channel aggregation is required is not made through the information input module 1602 or the like (No in step S2302), all subsequent processing steps are skipped, and this process ends.

Moreover, the multi-channel operation management unit 1705 determines the channels available for multi-channel aggregation from the usage status of the channels in a range described in the multi-channel aggregation announcement frame (Yes in step S2307), and the reception use channel setting unit 1713 sets the channels available for multi-channel aggregation on the reception side on the basis of the determination result (step S2308).

In step S2308 described above, for example, channels available for multi-channel aggregation are set excluding a frequency channel that may cause interference in communication of another network, whereby coexistence with a surrounding network can be implemented. Note that, in a case where there is no available channel for multi-channel aggregation (No in step S2307), available channel setting processing (step S2308) is skipped.

Next, when information of the RS slot for returning the Resend Request (continuation request) signal is acquired from the received multi-channel aggregation announcement frame (step S2309), the management signal construction unit 1706 records a position (channel and timing) of the RS slot for returning the continuation request signal (step S2310).

Then, the communication device 1600 returns, to the transmission side, the multi-channel aggregation response frame in which the parameters of the multi-channel aggregation are described (step S2311).

Note that, FIG. 23 illustrates an operation procedure in which the reception side sets the parameters of the multi-channel aggregation in response to the input from the user and the reception of the multi-channel aggregation announcement frame from the transmission side, and transmits the multi-channel aggregation response frame; however, the operation performed by the reception side prior to the reception of the multi-channel aggregation is not limited to the above. For example, for example, the parameters may be changed at arbitrary timings depending on changes in the environment of the transmission line and the degree of channel congestion, and the response frame may be transmitted each time the parameters are changed.

Finally, effects obtained by data transmission using the multi-channel aggregation according to the present embodiment will be summarized.

The multi-channel aggregation frame is transmitted having a configuration in which a plurality of MPDUS multiplexed in the time axis direction by applying the frame aggregation technology is further multiplexed in the frequency axis direction by channel bonding, so that data can be collected on the reception side without being affected even if interference exists in some channels.

Furthermore, in the present embodiment, the multi-channel aggregation frame has a frame configuration in which the order of aggregating the MPDUs is made different for each frequency channel and the MPDUs of respective channels are arranged not to overlap each other at the same time, so that data transmission can be ended if all the MPDUs are present on the reception side. That is, it is not necessary to complete the transmission of all the MPDUs on all channels used. Thus, even if data transmission is performed using a plurality of channels, it is possible to avoid a situation in which the frequency utilization efficiency is significantly degraded.

Furthermore, in the present embodiment, the multi-channel aggregation frame has a frame configuration in which the order of aggregating the subframes is made different for each frequency channel and the subframes of respective channels are arranged so as not to overlap each other at the same time. Thus, on the reception side, even if a specific frequency channel is continuously subjected to interference, unreached subframes can be collected on another (non-interfered) frequency channel at the next timing. Furthermore, on the reception side, even if all channels are subjected to interference at the same time, unreached subframes can be collected on another channel at another time.

Furthermore, on the transmission side, transmission is performed of the multi-channel aggregation frame excluding a frequency channel that may cause interference in communication of another network, whereby coexistence with a surrounding network can be implemented.

Furthermore, by providing a slot for returning the continuation request signal in a part of the multi-channel aggregation frame, the reception side can use the slot to return a signal notifying the transmission side that all subframes are not yet present. Then, the transmission side continues transmission of the multi-channel aggregation frame in response to this notification, so that the unreached subframes can be reliably delivered to the reception side.

Furthermore, by returning the continuation request signal for notification that the subframe has not arrived from the reception side, it is possible to save the trouble of returning a receipt confirmation (ACK) from the reception side after the transmission of all the subframes is completed.

Furthermore, through returning the continuation request signal for notification that the subframe has not arrived from the reception side, it is possible to notify surrounding other communication devices that the transmission line is still in use and avoid interference.

The reception side can use a surplus area of the aggregated subframes in some channels to return the continuation request signal requesting continuation of transmission of the multi-channel aggregation frame, so that it is not necessary to set a reverse communication channel to notify the transmission side of an unreached signal.

Moreover, in a case where the transmission of the multi-channel aggregation frame is stopped in the middle, the transmission side can notify the surrounding communication devices that occupied frequency channels has become reusable, by transmitting an end signal for notification that the multi-channel aggregation frame has become available for other communication.

INDUSTRIAL APPLICABILITY

In the above, the technology disclosed in this specification has been described in detail with reference to specific embodiments. However, it is obvious that those skilled in the art can make modifications and substitutions of the embodiments without departing from the scope of the technology disclosed in this specification.

The technology disclosed in this specification is applied to, for example, an IEEE 802.11-based wireless LAN system, and can implement highly reliable data communication while improving the transmission efficiency, by transmitting the aggregation frame in which subframes are multiplexed in the time axis direction and further multiplexed in the frequency axis direction.

Of course, the technology disclosed in this specification can be suitably applied to wireless LAN systems other than the IEEE 802.11-based. The technology disclosed in this specification can be applied to both downlink communication from a base station to a terminal station and uplink communication from a terminal station to a base station, for example, in a wireless network under infrastructure mode. Furthermore, in a wireless network in which each communication terminal operates in an autonomous and distributed manner, such as in an ad hoc mode, the technology disclosed in this specification can be similarly applied to direct communication between communication terminals. Furthermore, the technology disclosed in this specification can be applied to cellular communication systems similarly.

In short, the technology disclosed in this specification has been described in the form of exemplification, and the description content of this specification should not be interpreted restrictively. To determine the gist of the technology disclosed in this specification, the claims should be taken into consideration.

Note that, the technology disclosed in this specification can also have the following configuration.

(1) A communication device including:
 a generation unit that generates a transmission frame including an aggregation frame in which a sequence of subframes is multiplexed in a time axis direction and a frequency channel axis direction; and
 a transmission unit that wirelessly transmits the transmission frame.

(2) The communication device according to (1), in which
 the generation unit generates the aggregation frame to cause each of the subframes included in the sequence to be stored at least once in each of frequency channels.

(3) The communication device according to any of (1) or (2), in which
 the generation unit generates the aggregation frame aggregated to cause sequence order of the subframes to be different for each of frequency channels.

(4) The communication device according to any of (1) to (3), in which
 the generation unit generates the aggregation frame aggregated not to cause the subframes of respective frequency channels overlap each other at an identical time.

(5) The communication device according to any of (1) to (4), in which
 the generation unit generates the aggregation frame by adding padding by which each of the subframes is delimited by a predetermined symbol unit.

(6) The communication device according to any of (1) to (5), further including
an access control unit that controls access to each of frequency channels on the basis of a channel usage status by a surrounding network.

(7) The communication device according to (6), in which the access control unit controls transmission of the aggregation frame excluding a frequency channel that has a possibility of causing interference in communication of the surrounding network.

(8) The communication device according to any of (1) to (7), in which
the generation unit arranges, in the aggregation frame, at least one slot for receiving a predetermined signal from a data reception side.

(9) The communication device according to (8), in which the generation unit sets, as the slot, a time obtained by adding times for transmission of the predetermined signal and for switching of transmission and reception.

(10) The communication device according to any of (8) or (9), further including:
a reception unit that receives the predetermined signal in the slot, and
a management unit that manages a transmission sequence of the aggregation frame from the transmission unit on the basis of the predetermined signal.

(11) The communication device according to (10), in which
the management unit causes transmission of the aggregation frame to continue in response to receiving a continuation request signal for requesting continuous transmission of the aggregation frame from the data reception side in the slot, and causes the transmission of the aggregation frame to end in a case where the continuation request signal is no longer received.

(12) The communication device according to any of (1) to (11), in which
when transmission of the aggregation frame is ended, the generation unit generates a predetermined end signal, and the transmission unit wirelessly transmits the end signal.

(12-1) The communication device according to (12), in which
in a case where the transmission of the aggregation frame is ended in the middle, the end signal is wirelessly transmitted.

(13) A communication method including:
generating an aggregation frame in which a sequence of subframes is multiplexed in a time axis direction and a frequency channel axis direction; and
wirelessly transmitting the transmission frame.

(14) A communication device including:
a reception unit that receives a wireless frame including an aggregation frame in which a sequence of subframes is multiplexed in a time axis direction and a frequency channel axis direction; and
a construction unit that collects the subframes included in the aggregation frame received, and reconstructs a sequence of the subframes.

(15) The communication device according to (14), in which
the reception unit estimates a position of a boundary of each of the subframes in a frequency channel in which a preamble signal is not received, on the basis of a signal of a frequency channel in which the preamble signal is received.

(16) The communication device according to any of (14) or (15), further including
a transmission unit that transmits a continuation request signal for requesting continuous transmission of the aggregation frame until all the subframes of the sequence included in the aggregation frame is collected.

(17) The communication device according to (16), in which
the transmission unit transmits the continuation request signal by using at least one slot arranged in the aggregation frame.

(18) The communication device according to (16), in which
the transmission unit transmits the continuation request signal excluding a frequency channel that has a possibility of causing interference in communication of a surrounding network.

(19) The communication device according to any of (14) to (18), in which
in a case where an end signal for notification of a transmission end of the aggregation frame is received, it is determined that a transmission line used for transmission of the aggregation frame has become available.

(20) A communication method including:
receiving an aggregation frame in which a sequence of subframes is multiplexed in a time axis direction and a frequency channel axis direction; and
collecting the subframes included in the aggregation frame received, and reconstructing a sequence of the subframes.

(21) A communication system including:
a transmission device that transmits an aggregation frame in which a sequence of subframes is multiplexed in a time axis direction and a frequency channel axis direction; and
a reception device that receives the aggregation frame to collect the subframes, and constructs a sequence of the original subframes.

(22) A computer program written in a computer readable format to cause a computer to function as:
a generation unit that generates a transmission frame including an aggregation frame in which a sequence of subframes is multiplexed in a time axis direction and a frequency channel axis direction; and
a transmission control unit that controls wireless transmission of the transmission frame.

(23) A computer program written in a computer readable format to cause a computer to function as:
a reception unit that receives a wireless frame including an aggregation frame in which a sequence of subframes is multiplexed in a time axis direction and a frequency channel axis direction; and
a construction unit that collects the subframes included in the aggregation frame received, and reconstructs a sequence of the subframes.

REFERENCE SIGNS LIST

1600 Communication device
1601 Internet connection module
1602 Information input module
1603 Device control unit
1604 Information output module
1605 Wireless communication module
1701 Interface 1702 Transmission buffer
1703 Network management unit
1704 Transmission frame construction unit
1705 Multi-channel operation management unit
1706 Management signal construction unit
1707 Transmission use channel setting unit
1708 Transmission power control unit
1709 Wireless transmission processing unit
1710 Antenna control unit
1711 Wireless reception processing unit
1712 Detection threshold control unit
1713 Reception use channel setting unit
1714 Sequence control unit
1715 Reception data construction unit
1716 Reception buffer

The invention claimed is:

1. A communication device comprising:
control circuitry that generates a transmission frame including an aggregation frame in which a sequence of subframes is multiplexed in a time axis direction and a frequency channel axis direction;
a transmitter that wirelessly transmits the transmission frame,
wherein the control circuitry arranges, in the aggregation frame, at least one slot for receiving a predetermined signal from a reception side; and
a receiver that receives the predetermined signal in the slot,
wherein the control circuitry:
manages a transmission sequence of the aggregation frame from the transmitter on a basis of the predetermined signal, and
causes transmission of the aggregation frame to continue in response to receiving a continuation request signal for requesting continuous transmission of the aggregation frame from the reception side in the slot, and causes the transmission of the aggregation frame to end in a case where the continuation request signal is no longer received.

2. The communication device according to claim 1, wherein the control circuitry generates the aggregation frame to cause each of the subframes included in the sequence to be stored at least once in each of frequency channels.

3. The communication device according to claim 1, wherein the control circuitry generates the aggregation frame aggregated to cause sequence order of the subframes to be different for each of frequency channels.

4. The communication device according to claim 1, the control circuitry generates the aggregation frame aggregated not to cause the subframes of respective frequency channels overlap each other at an identical time.

5. The communication device according to claim 1, the control circuitry generates the aggregation frame by adding padding by which each of the subframes is delimited by a predetermined symbol unit.

6. The communication device according to claim 1, wherein the control circuitry controls access to each of frequency channels on a basis of a channel usage status by a surrounding network.

7. The communication device according to claim 6, wherein the control circuitry controls transmission of the aggregation frame excluding a frequency channel that has a possibility of causing interference in communication of the surrounding network.

8. The communication device according to claim 1, wherein the control circuitry sets, as the slot, a time obtained by adding times for transmission of the predetermined signal and for switching of transmission and reception.

9. The communication device according to claim 1, wherein when transmission of the aggregation frame is ended, the control circuitry generates a predetermined end signal, and the transmitter wirelessly transmits the end signal.

10. A communication method performed by a communication device, the communication method comprising:
generating an aggregation frame in which a sequence of subframes is multiplexed in a time axis direction and a frequency channel axis direction; and
wirelessly transmitting the transmission frame,
wherein the communication method further comprises:
arranging, in the aggregation frame, at least one slot for receiving a predetermined signal from a reception side; and
receiving the predetermined signal in the slot,
wherein the communication method further comprises:
managing a transmission sequence of the aggregation frame from the transmitter on a basis of the predetermined signal, and
causing transmission of the aggregation frame to continue in response to receiving a continuation request signal for requesting continuous transmission of the aggregation frame from the reception side in the slot, and causes the transmission of the aggregation frame to end in a case where the continuation request signal is no longer received.

11. A communication device comprising:
a receiver that receives a wireless frame including an aggregation frame in which a sequence of subframes is multiplexed in a time axis direction and a frequency channel axis direction; and
control circuitry that collects the subframes included in the aggregation frame received, and reconstructs a sequence of the subframes,
wherein the control circuitry estimates a position of a boundary of each of the subframes in a frequency channel in which a preamble signal is not received, on a basis of a signal of a frequency channel in which the preamble signal is received.

12. The communication device according to claim 11, further comprising
a transmitter that transmits a continuation request signal for requesting continuous transmission of the aggregation frame until all the subframes of the sequence included in the aggregation frame is collected.

13. The communication device according to claim 12, wherein the transmitter transmits the continuation request signal by using at least one slot arranged in the aggregation frame.

14. The communication device according to claim 12, wherein the transmitter transmits the continuation request signal excluding a frequency channel that has a possibility of causing interference in communication of a surrounding network.

15. The communication device according to claim 11, wherein in a case where an end signal for notification of a transmission end of the aggregation frame is received, it is determined that a transmission line used for transmission of the aggregation frame has become available.

16. A communication method performed by a communication device, the communication method comprising:
receiving an aggregation frame in which a sequence of subframes is multiplexed in a time axis direction and a frequency channel axis direction;

collecting the subframes included in the aggregation frame received, and reconstructing a sequence of the subframes; and estimating a position of a boundary of each of the subframes in a frequency channel in which a preamble signal is not received, on a basis of a signal of a frequency channel in which the preamble signal is received.

17. The communication method of claim 16, further comprising:

transmitting a continuation request signal for requesting continuous transmission of the aggregation frame until all the subframes of the sequence included in the aggregation frame is collected, wherein the continuation request signal is transmitted by using at least one slot arranged in the aggregation frame, or the continuation request signal is transmitted excluding a frequency channel that has a possibility of causing interference in communication of a surrounding network.

\* \* \* \* \*